(12) United States Patent
Furihata et al.

(10) Patent No.: US 7,165,904 B2
(45) Date of Patent: Jan. 23, 2007

(54) PRINTER AND MEDIUM TRANSPORTATION ASSEMBLY

(75) Inventors: Hideki Furihata, Okaya (JP);
Katsuyuki Endo, Matsumoto (JP);
Sadao Murata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 10/826,040

(22) Filed: Apr. 15, 2004

(65) Prior Publication Data

US 2004/0265032 A1 Dec. 30, 2004

(30) Foreign Application Priority Data

| Apr. 15, 2003 | (JP) | ............................. 2003-110363 |
| Aug. 22, 2003 | (JP) | ............................. 2003-299071 |

(51) Int. Cl.
*B41J 29/02* (2006.01)

(52) U.S. Cl. ...................................... 400/693; 400/595

(58) Field of Classification Search ............... 400/595, 400/596, 607, 607.2, 608.4; 235/2–5, 7 R
See application file for complete search history.

(56) References Cited

U.S. PATENT DOCUMENTS

| 4,996,604 | A | * | 2/1991 | Ogawa et al. ............... 358/474 |
| 5,137,385 | A | * | 8/1992 | Kamimura et al. ....... 400/690.4 |
| 5,386,106 | A | | 1/1995 | Kumar |
| 5,718,526 | A | * | 2/1998 | Yokota ....................... 400/605 |
| 5,779,371 | A | * | 7/1998 | Aoyama et al. ........ 400/120.16 |
| 5,927,878 | A | * | 7/1999 | Kasai et al. ................. 400/691 |
| 5,988,903 | A | | 11/1999 | Baitz et al. |
| 6,030,133 | A | * | 2/2000 | Endo ............................ 400/82 |
| 6,068,187 | A | * | 5/2000 | Momose ..................... 235/449 |
| 6,181,361 | B1 | | 1/2001 | Bluteau et al. |
| 6,443,645 | B1 | | 9/2002 | Takei et al. |

(Continued)

FOREIGN PATENT DOCUMENTS

EP 0 785 080 A2 7/1997

(Continued)

OTHER PUBLICATIONS

European Search Report citing above six references.

*Primary Examiner*—Daniel J. Colilla
*Assistant Examiner*—Marissa Ferguson-Samreth
(74) *Attorney, Agent, or Firm*—Anderson Kill + Olick, PC; Eugene Lieberstein

(57) ABSTRACT

A printer with an image scanning sensor for reading image data in confined spaces comprising a case unit 11 with a roll paper compartment 30 for holding roll paper P, a front cover unit 12 for forming a slip transportation path 21 for conveying slips S between the front cover unit 12 and case unit 11 and a top cover unit 13 rendered to open and close to the case unit 11 so that it closes the roll paper compartment 30 when closed and simultaneously forms a roll paper transportation path 35 for conveying roll paper P between the case unit 11 and the top cover unit 13. The printer includes; slip printing units 23, 25 disposed to the slip transportation path 21 for printing to slips S; a thermal print head 33 disposed to the roll paper transportation path 35 for printing to roll paper P; and an image scanning sensor 44 disposed to the top cover unit 13 for reading image data recorded to a card C.

30 Claims, 23 Drawing Sheets

U.S. PATENT DOCUMENTS 6,633,414 B1 * 10/2003 Matsuda et al. ............ 358/474

FOREIGN PATENT DOCUMENTS

| | | |
|---|---|---|
| EP | 0 876 922 A | 11/1998 |
| JP | 11-284801 | 10/1999 |
| JP | 2000-22868 | 1/2000 |
| JP | 2000-131907 | 5/2000 |
| JP | 2001-077956 | 3/2001 |
| JP | 2001-341369 | 12/2001 |
| JP | 2002-356002 | 12/2002 |
| JP | 2003-186267 | 7/2003 |

* cited by examiner

PRINTER AND MEDIUM TRANSPORTATION ASSEMBLY

BACKGROUND OF THE INVENTION

1. Field of Technology

The present invention relates to a medium transportation assembly and a printer capable of printing to both continuous paper and slips, and reading image data recorded to a card or other recording medium.

2. Description of Related Art

Continuous form (roll paper) printers that print to roll paper for issuing sales receipts, entrance tickets, and the like, and slip printers for printing to personal and business checks and other types of slips, are widely used. These printers include hybrid printers having both a roll paper printing function and a slip printing function so that a single printer can print to both roll paper and slips.

An example of such a hybrid printer is shown in FIG. 23, for example. The hybrid printer 210 shown in FIG. 23 has a roll paper P loading opening 221 in the top of the case 220, and a compartment 222 for housing roll paper P inside the case 220. The roll paper P is held freely rotatably inside the compartment 222 with one end of the roll paper P delivered to the front inside the case 220 so that it passes a transportation path 223 formed inside the case 220 when the cover 230 is closed. A thermal print head 224 is disposed along this transportation path 223, and prints to the roll paper P.

The cover 230 opens and closes the loading opening 221, and has a slip insertion face 231 for inserting slips at the top front side of the cover 230. A slip guide 232 is formed along the insertion direction of the slip S along one edge of this slip insertion face 231. When the cover 230 is closed, a roll paper P exit 225 is formed by the gap between the case 220 and edge of the cover 230 when the cover 230 is closed at a position below the slip insertion face 231. A slip printing unit 260 is also disposed at the top back part of the cover 230. See, for example, Japanese Unexamined Patent Appl. Pub. 2001-341369 (page 5, FIG. 2). Scanners for capturing image data recorded/printed on media such as driver licenses and credit cards with a photograph of the credit card holder are increasingly installed in stores in conjunction with hybrid printers such as described above. This obviously requires sufficient space to install both the hybrid printer and scanner, that is, two separate devices, and thus often requires some modification to create the needed space. More specifically, the scanner and hybrid printer are typically installed at a checkout counter where space is limited, and it can be difficult to provide space sufficient to install both a scanner and printer.

Furthermore, when the scanner and hybrid printer are two discrete devices, the scanner and hybrid printer operate independently. Two devices must therefore be operated, and this reduces overall operating and job efficiency.

When communication between the scanner and hybrid printer is enabled, the separate hybrid printer and scanner must be linked together using another device and cables. This obviously further increases the number of components used in the installation, and puts further pressure on the needed installation space.

The present invention solves the problems identified above with the printer providing both a printer function and a scanner function in one efficient installation.

The medium transportation assembly of the present invention transports a data recording medium which can be externally inserted therein to a scanner mechanism for reading data recorded on the data recording medium.

SUMMARY OF THE INVENTION (1) The printer of the present invention broadly comprises:
a back case unit having a continuous paper compartment for holding continuous paper;
a top cover unit assembled to open and close to the back case unit so as to cover the continuous paper compartment when closed, and for forming a continuous paper transportation path for conveying the continuous paper between the top cover unit and back case unit when opened;
a first print unit disposed to the continuous paper transportation path for printing to the continuous paper; and
a data reading device disposed to the top cover unit for reading information recorded to an external medium when the medium is inserted into the printer.

(2) The medium transportation assembly of the present invention broadly comprises:
a housing having a top cover unit and a body to which the top cover is connected for opening and closing the top cover;
a data reading device disposed to the top cover for reading information recorded to a data recording medium adapted to be externally inserted into the housing;
an internal cover located between the top cover unit and the body which can open and close when the top cover is open and being assembled relative to the top cover such that a medium transportation path is formed for conveying the data recording medium to the data recording device only when the internal cover is closed.

The phrase "to read image data" is used in this text in a broad sense covering both the scanning of an image such as a photograph to convert the image to image data for further processing, and the reading of image data stored in any of various ways, including one or two-dimensional bar codes, on a card as a data carrier. The particular kind of image or image data and the way of scanning or reading it is not critical for the present invention in its broadest aspect.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of a printer with an image scanning sensor according to the present invention are described in detail below with reference to the accompanying figures.

Embodiment 1

A first embodiment of a printer 10 which includes an image scanning sensor according to this embodiment of the present invention is described below.

Figure 1:
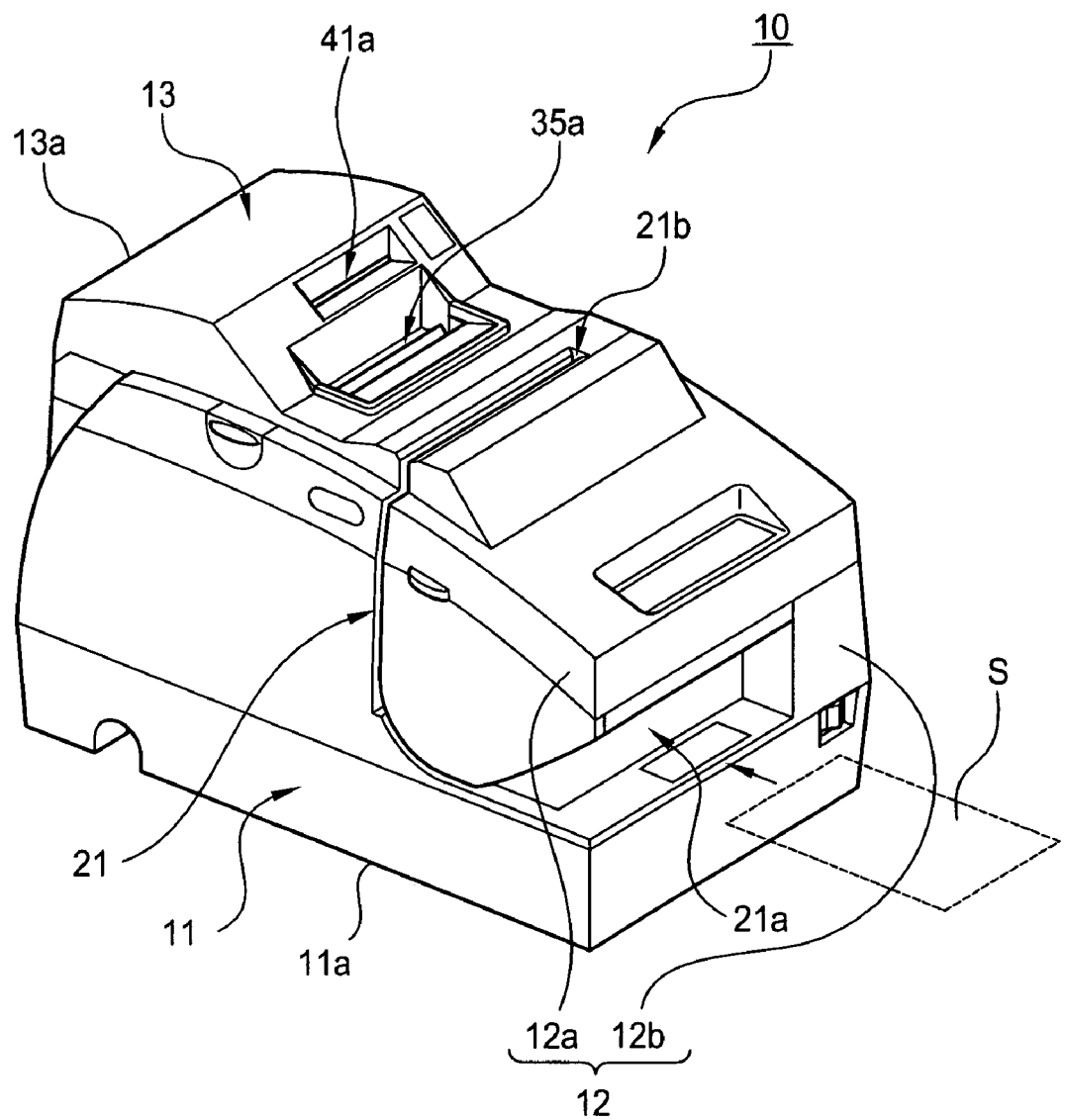
FIG. 1 is an oblique external view of a printer with an image scanning sensor according to the present invention.
Figure 4:
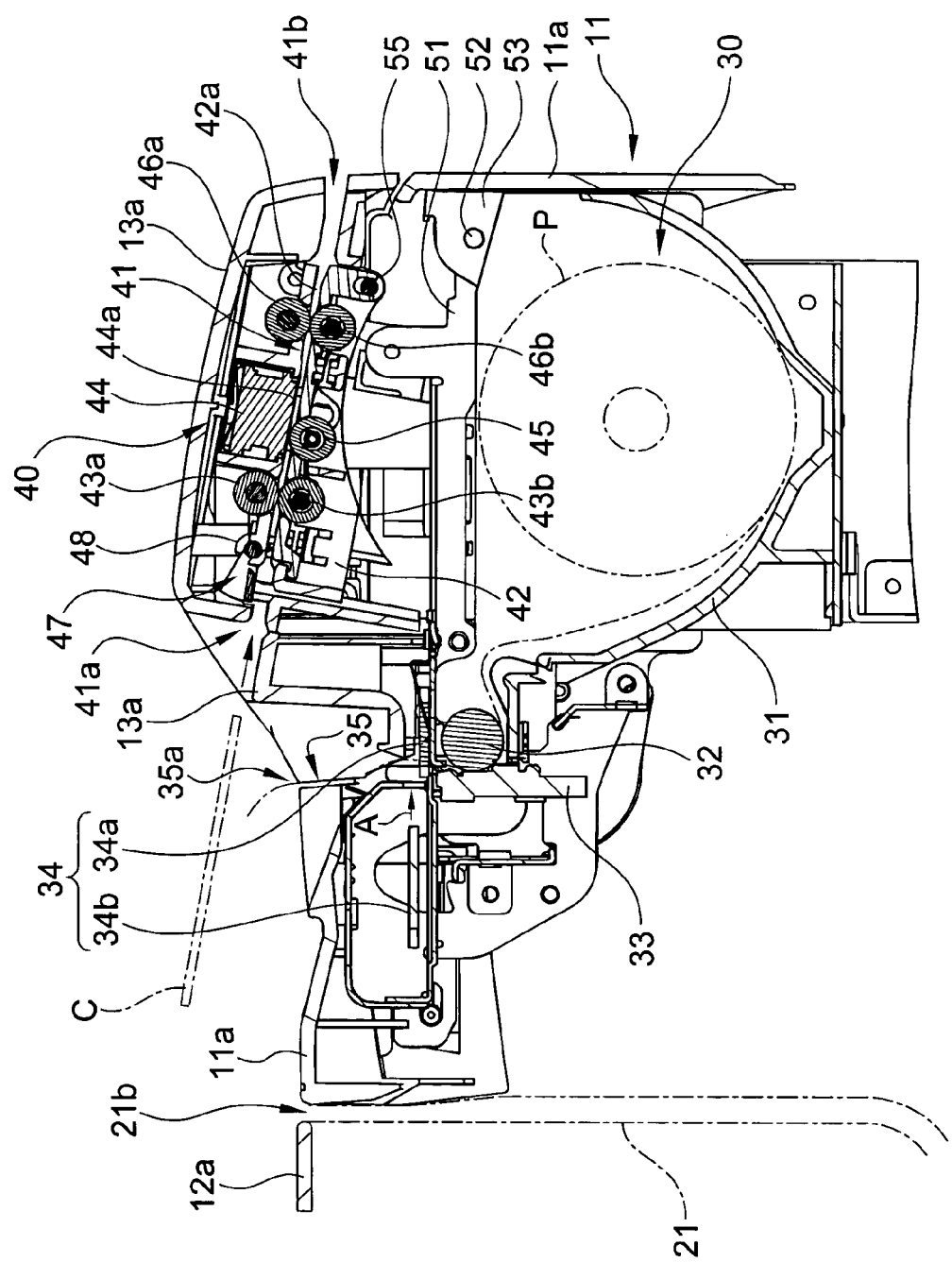
FIG. 4 is a partial section view of the printer with an image scanning sensor.

The printer 10 of FIG. 1 is a hybrid printer which can print both to roll paper P (see FIG. 4) and to slips S (see FIG. 2), and can read image data recorded on a media card C (see FIG. 4).

This printer 10 has an integrally configured back case unit 11, front cover unit 12, and top cover unit 13. The back case unit 11 houses roll paper P as a continuous recording medium inside a case 11a, and a printer mechanism for printing to the roll paper P. The front cover unit 12 is disposed in front of the back case unit 11, and forms a slip transportation path 21 through which slips S are conveyed between the front cover unit 12 and back case unit 11. The top cover unit 13 is assembled in order to cover the top of the back case unit 11, and houses an image scanning sensor mechanism for reading image data recorded to cards and other media.

Figure 2:
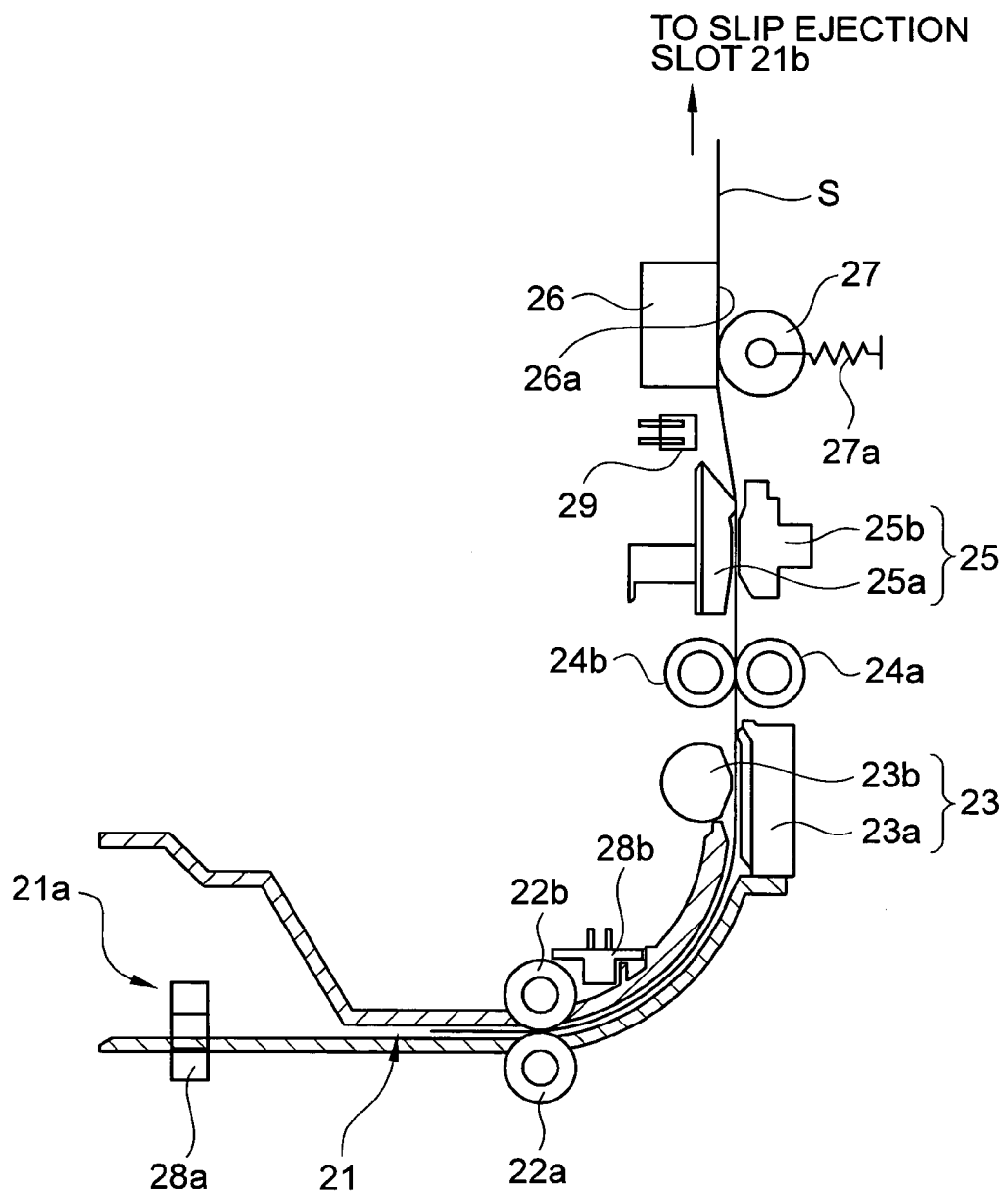
FIG. 2 is a cross sectional view of the slip transportation path in the printer of FIG. 1.

The front cover unit 12 is composed of a front cover 12a separated from the back case unit 11 by the slip transportation path 21, and a front side unit 12b supporting the front cover 12a in a cantilevered manner. As shown in FIG. 1 and FIG. 2, a slip S can be inserted to the slip transportation path 21 from the slip insertion opening 21a, which opens into the gap between the case 11a of back case unit 11 and front cover 12a of front cover unit 12 at the front of the printer 10.

As shown in FIG. 2, a slip S inserted to the slip transportation path 21 is conveyed to a back printing unit 23 disposed to the slip transportation path 21 by a sub slip transportation roller 22a and a sub slip pressure roller 22b, which is disposed opposite the sub slip transportation roller 22a with the slip transportation path 21 therebetween.

The back printing unit 23 is composed of a serial impact dot matrix printing unit 23a disposed on the reverse or back side of the slip S, and a platen 23b disposed opposite the dot matrix printing unit 23a with the slip transportation path 21 therebetween. This dot matrix printing unit 23a prints the reverse (back) side of the slip S.

As the slips S is conveyed downstream from the back printing unit 23, it is carried by a slip transportation roller 24a and sub slip pressure roller 24b disposed opposite the slip transportation roller 24a with the slip transportation path 21 therebetween to a front printing unit 25 also disposed to the slip transportation path 21.

This front printing unit 25 is composed of a serial impact dot matrix printing unit 25a disposed to the front side of the slip S, and a platen 25b disposed opposite the dot matrix printing unit 25a with the slip transportation path 21 therebetween. This dot matrix printing unit 25a can thus print the front of the slip S. When the slip S is then conveyed further downstream from the front printing unit 25, it passes the slip image scanning sensor 26.

The slip image scanning sensor 26 is a contact image sensor (CIS) type image scanner, and is disposed to scan the front side of the slip S. A pressure roller 27 is disposed opposite the slip image scanning sensor 26 with the slip transportation path 21 therebetween. This pressure roller 27 presses the slip S to the scanning surface 26a of the slip image scanning sensor 26 with specific pressure corresponding to the thickness of the slip by means of pressure member 27a. The slip image scanning sensor 26 is configured to read image data recorded to the front of the slip image scanning sensor 26 with the slip S pressed to the scanning surface 26a by the pressure roller 27. The slip S is then discharged from the slip exit 21b after it passes between the slip image scanning sensor 26 and pressure roller 27.

A trailing edge sensor 28a disposed to the slip insertion opening 21a, and a leading edge sensor 28b disposed downstream of the sub slip pressure roller 22b, are used to detect the presence of a slip S in the slip transportation path 21, and to control indexing to the front printing unit 25 and back printing unit 23 when printing the slip.

An ejection detector 29 is disposed between the front printing unit 25 and slip image scanning sensor 26 for detecting if the slip S has been discharged from the slip transportation path 21.

The operation of the slip transportation path 21, and operations along the slip transportation path 21, are described above.

The roll paper transportation path 35 and operations executed along the roll paper transportation path 35 are described next with reference to FIG. 4.

The roll paper transportation path 35 is formed between the back case unit 11 and top cover unit 13. The roll paper P is housed in a roll paper compartment 30, which is formed by a roll paper support wall 31 inside the back case unit 11. The roll paper P is conveyed along the roll paper transportation path 35, and is discharged from the roll paper exit 35a opened between the case 11a and top cover 13a.

The roll paper compartment 30 is a drop-in type roll paper compartment enabling the roll paper P to be simply dropped into the roll paper compartment 30. Paper is supplied from the roll as the roll paper P rotates guided by the roll paper support wall 31. The end of the roll paper P inside the roll paper compartment 30 is pulled out from the roll paper compartment 30 and passed between the platen roller 32 and thermal print head 33.

Figure 5:
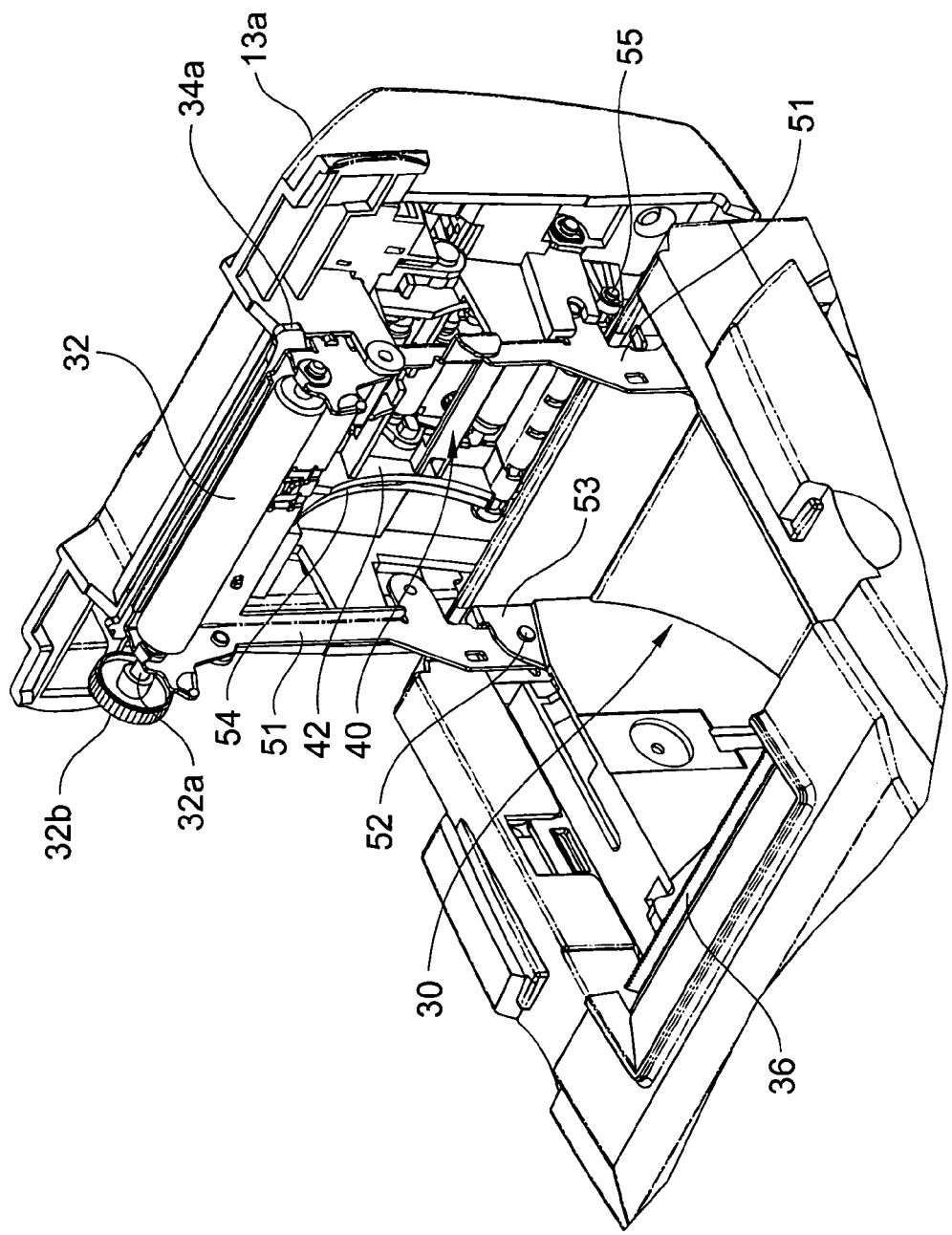
FIG. 5 is an oblique view showing the printer when the top cover unit is open.

The axle 32a of the platen roller 32 is axially supported freely rotatably to the frame 51 of the top cover unit 13 as shown in FIG. 5. A gear 32b on the end of the axle 32a is rotationally driven by a motor not shown, thereby rotationally driving the platen roller 32 and conveying the roll paper P.

The thermal print head 33 is configured for printing text on the roll paper P conveyed by the platen roller 32. The printed roll paper P then passes through the roll paper transportation path 35 and is discharged from the roll paper exit 35a.

As shown in FIG. 4, an automatic paper cutter 34 is disposed above the platen roller 32 and thermal print head 33. This automatic paper cutter 34 has a stationary knife 34a disposed on one side of the roll paper transportation path 35, and a movable knife 34b disposed on the other side of the roll paper transportation path 35 opposite the stationary knife 34a.

The stationary knife 34a is supported by the frame 51 of the top cover unit 13 near the platen roller 32 as shown in FIG. 5.

The movable knife 34b is configured movably to the roll paper transportation path in the direction of arrow A in FIG. 4 so that it can cut the roll paper P between the movable knife 34b and stationary knife 34a.

Figure 3:
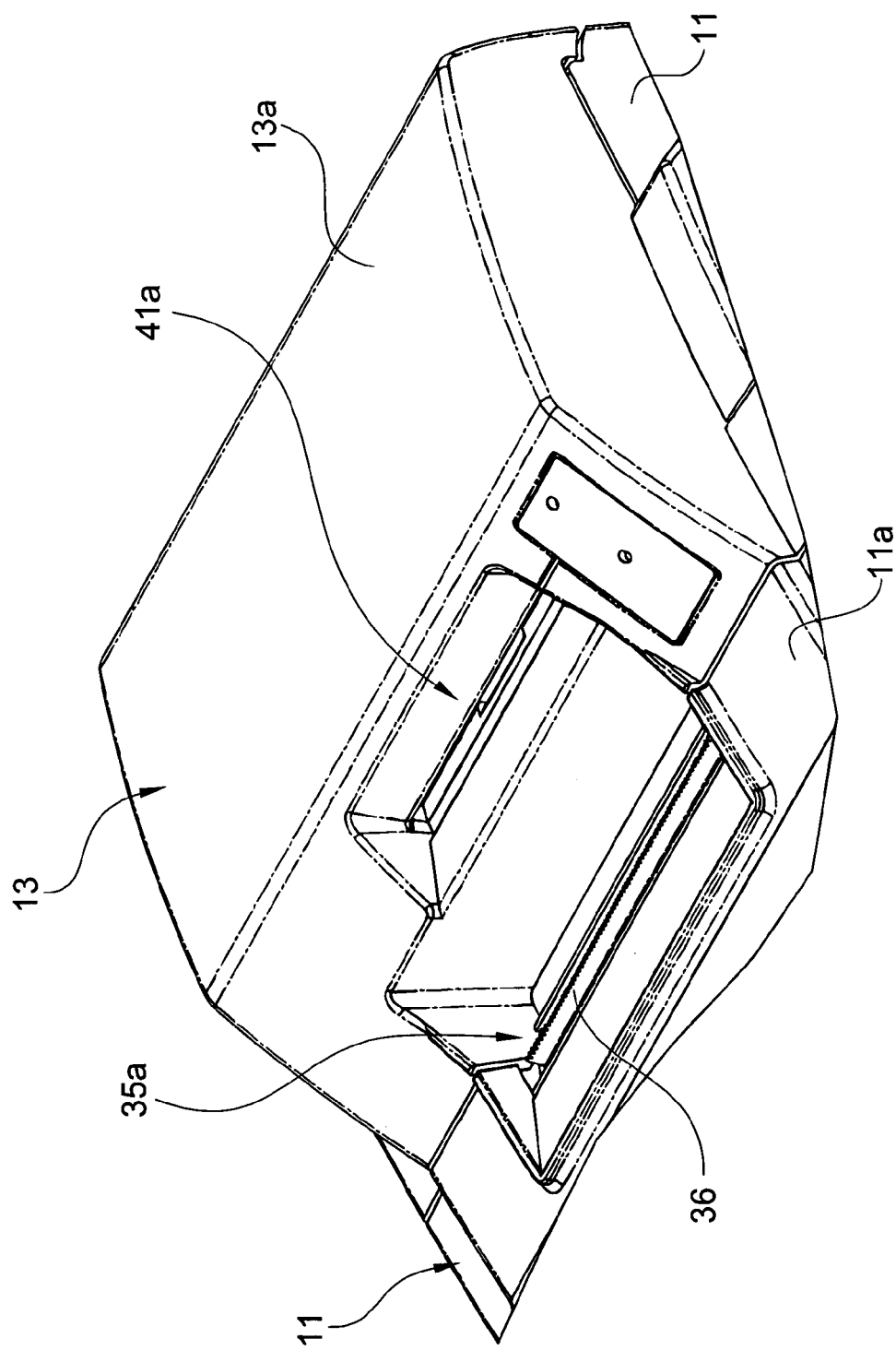
FIG. 3 is an oblique view showing the top cover unit of the printer with an image scanning sensor.

A fixed knife 36 for roll paper cutting is disposed with the length of the fixed knife 36 crosswise to the roll paper exit 35a near the roll paper exit 35a as shown in FIG. 3. This fixed knife 36 for roll paper cutting is used to manually cut the roll paper P. While this embodiment of the invention has both an automatic paper cutter 34 and a fixed knife 36 for manually cutting the roll paper, the invention could be configured using only one.

Figure 6:
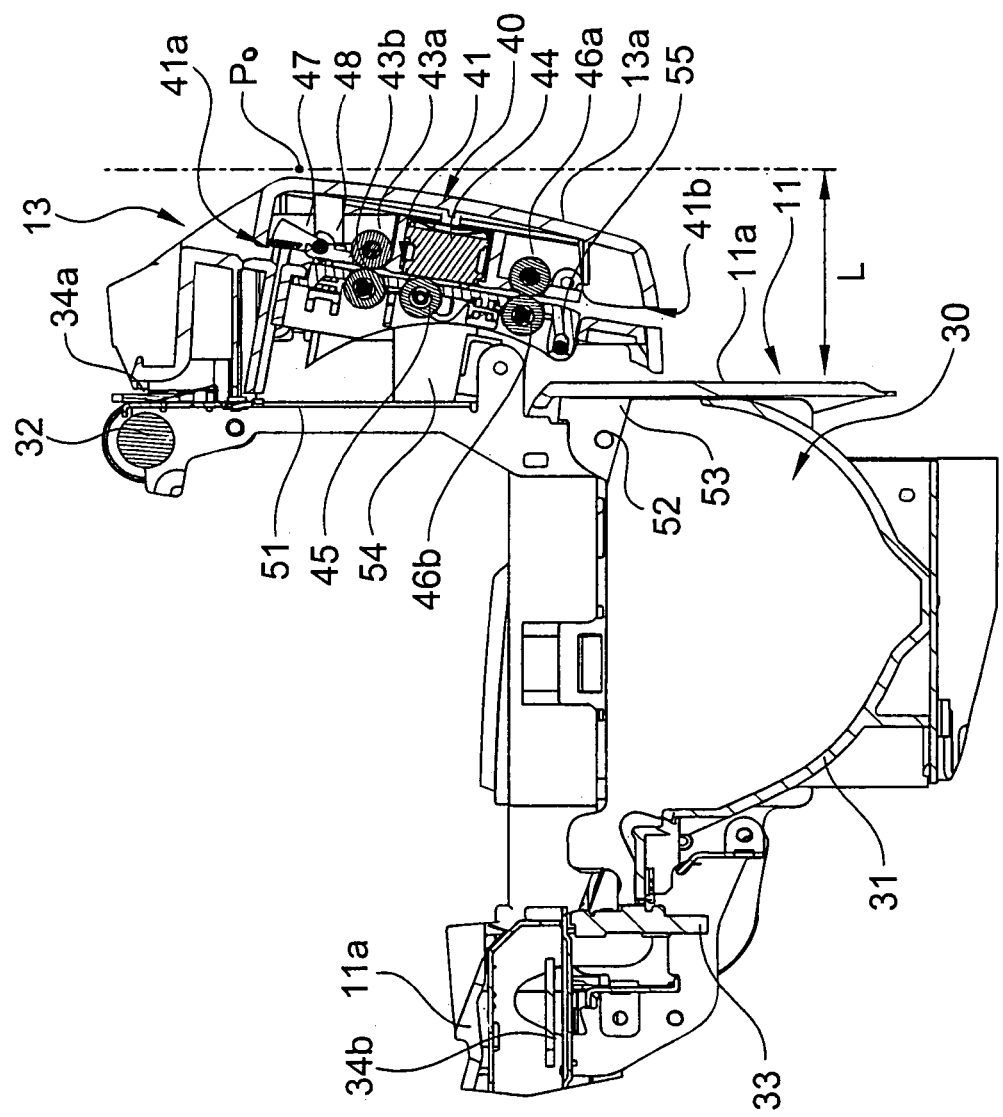
FIG. 6 is a section view showing the printer when the top cover unit is open.

Disposed below the top cover unit 13 is the main frame 51 as shown in FIG. 5 and FIG. 6. This frame 51 swings on a hinge 52 relative to a stationary part 53 assembled to the back case unit 11, thereby enabling the top cover unit 13 to open and close to the roll paper compartment 30. To replace the roll paper P, the top cover unit 13 pivots on the hinge 52 to open so that roll paper P can be inserted to the roll paper compartment 30.

The card image scanning unit 40 is described next. As shown in FIG. 4, the card image scanning unit 40 is disposed between the top cover 13a and roll paper compartment 30, enabling thick media such as a card C to be inserted from card insertion slot 41a to the card transportation path 41 so that image data can be captured from the card C.

A first transportation roller 43a, card image scanning sensor 44, and second transportation roller 46a are disposed in the card image scanning unit 40 along the card transportation path 41 on the top side of the card transportation path 41, that is, on the top cover 13a side. Below the card transportation path 41, that is, on the roll paper compartment 30 side, a first pressure roller 43b, pressure roller 45, and second pressure roller 46b are disposed opposite the first transportation roller 43a, card image scanning sensor 44, and second transportation roller 46a.

The first transportation roller 43a and first pressure roller 43b are located between the card insertion slot 41a and card image scanning sensor 44 (upstream from the card image scanning sensor 44) for conveying a card C inserted to the card transportation path 41 bidirectionally through the card transportation path 41. A card C conveyed by the first transportation roller 43a and first pressure roller 43b is carried between the card image scanning sensor 44 and pressure roller 45.

The card image scanning sensor 44 is a CIS scanner for reading text and images recorded to the front of the card. The card image scanning sensor 44 scans the text and/or images on the surface of a card C to form obtain corresponding image data of. While being scanned the card C is pressed against the scanning surface 44a of the card image scanning sensor 44 by pressure roller 45 with pressure appropriate to the card thickness.

The second transportation roller 46a and second pressure roller 46b are located downstream from the card image scanning sensor 44, and convey a card C inserted to the card transportation path 41 bidirectionally through the card transportation path 41.

An overhang opening 41b is formed on the side of the second transportation roller 46a and second pressure roller 46b remote from the opposite card image scanning sensor 44 where the card transportation path 41 crosses outline of the top cover 13a. When a card C inside the card transportation path 41 is delivered to and held nipped by second transportation roller 46a and second pressure roller 46b on the downstream side of the card transportation path 41, this overhang opening 41b briefly permits removing the card C from the back side of the printer 10.

During the actual scanning operation, the card C inserted from the card insertion slot 41a is conveyed by the first transportation roller 43a and first pressure roller 43b, and the second transportation roller 46a and second pressure roller 46b, from the card insertion slot 41a side toward the overhang opening 41b until the card C has passed completely beyond the card image scanning sensor 44. The card C is then conveyed toward the card insertion slot 41a side by driving the first transportation roller 43a and second transportation roller 46a in reverse. Text or image data is read from the card C surface by the card image scanning sensor 44 as the card C passes over the scanning surface 44a of the card image scanning sensor 44. After reading the card C ends, the card C is discharged from the printer 10 from the card insertion slot 41a.

The second transportation roller 46a is set so that the card C can overhang from the overhang opening 41b so that the overhanging part of the card C is shorter than distance L between the back side of the back case unit 11 and the position Po where the top cover unit 13 is farthest from the back side of the printer, that is, from the back side of the back case unit 11, when the top cover unit 13 is open as shown in FIG. 6.

This anticipates an installation where there is a wall behind the back of the printer 10 and the printer 10 must be positioned at least distance L away from the wall so that the top cover unit 13 can be opened and held open as shown in FIG. 6. Therefore, by setting the exposed length of the card C to less than distance L, the card C will not hit the top cover unit 13 can be opened and held open as shown in FIG. 6. Therefore, by setting the exposed length of the card C to less than distance L, the card C will not hit the wall behind the printer 10 when the card C is conveyed out from the overhang opening 41b. The problem of the card C being conveyed out from the overhang opening 41b and hitting the wall is thus eliminated, and this printer 10 with an image scanning sensor can be used without worry.

The first pressure roller 43b, pressure roller 45, and second pressure roller 46b located on the roll paper compartment 30 side are rotatably supported on an internal cover 42 disposed between the card transportation path 41 and roll paper compartment 30. A card transportation surface 42a describing part of the card transportation path 41 is formed on the top side of the internal cover 42. The first pressure roller 43b, pressure roller 45, and second pressure roller 46b are disposed protruding from the card transportation surface 42a so that they respectively contact the first transportation roller 43a, card image scanning sensor 44, and second transportation roller 46a.

Figure 7:
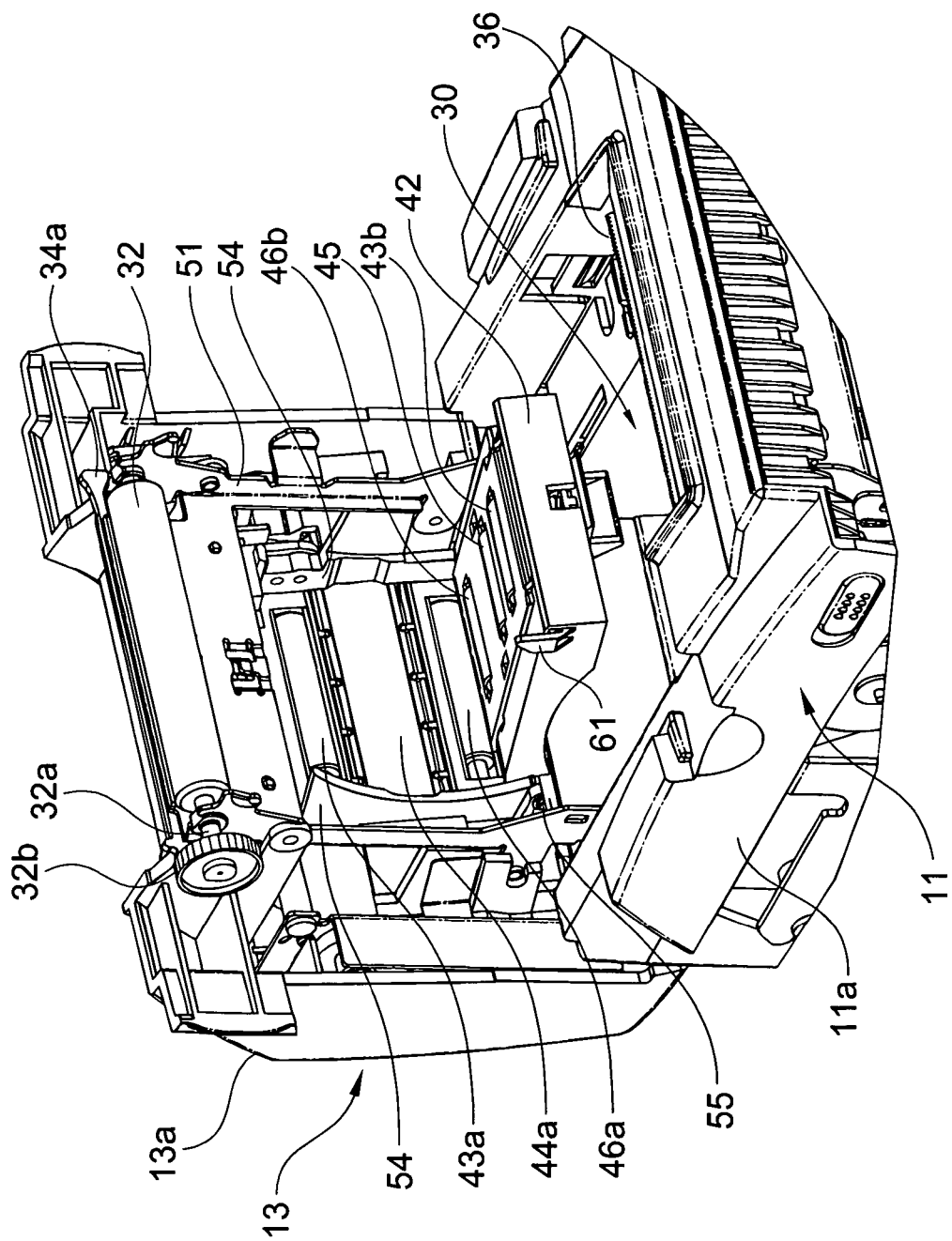
FIG. 7 is an oblique view showing the printer when the top cover unit is open and the internal cover therein side is also open.
Figure 8:
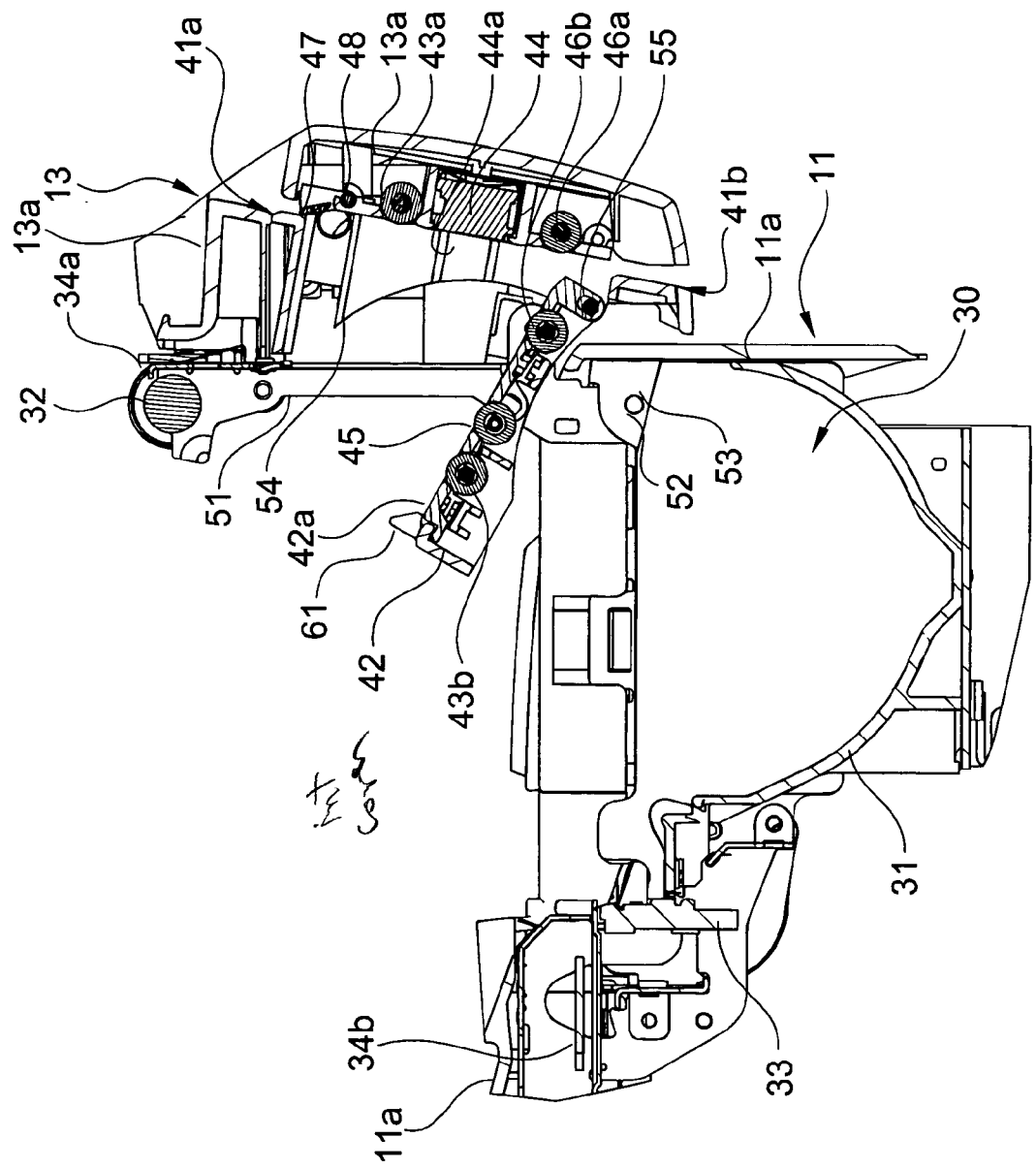
FIG. 8 a section view showing the printer when the top cover unit is open and the internal cover thereinside is also open.

As shown in FIG. 7 and FIG. 8, guide walls 54 project substantially perpendicularly to the top cover unit 13 along the direction of card transportation, and the internal cover 42 is rotatably assembled to guide walls 54 on an intervening hinge 55. More specifically, the hinge 55 is disposed on the back side of the internal cover 42, and the front of the internal cover 42 faces upward when the top cover unit 13 is opened. The internal cover 42 can then be opened so that the front of the internal cover 42 faces the front of the printer 10, thereby enabling easy access to and maintenance of card transportation path 41 parts from the front of the printer 10.

Figure 9:
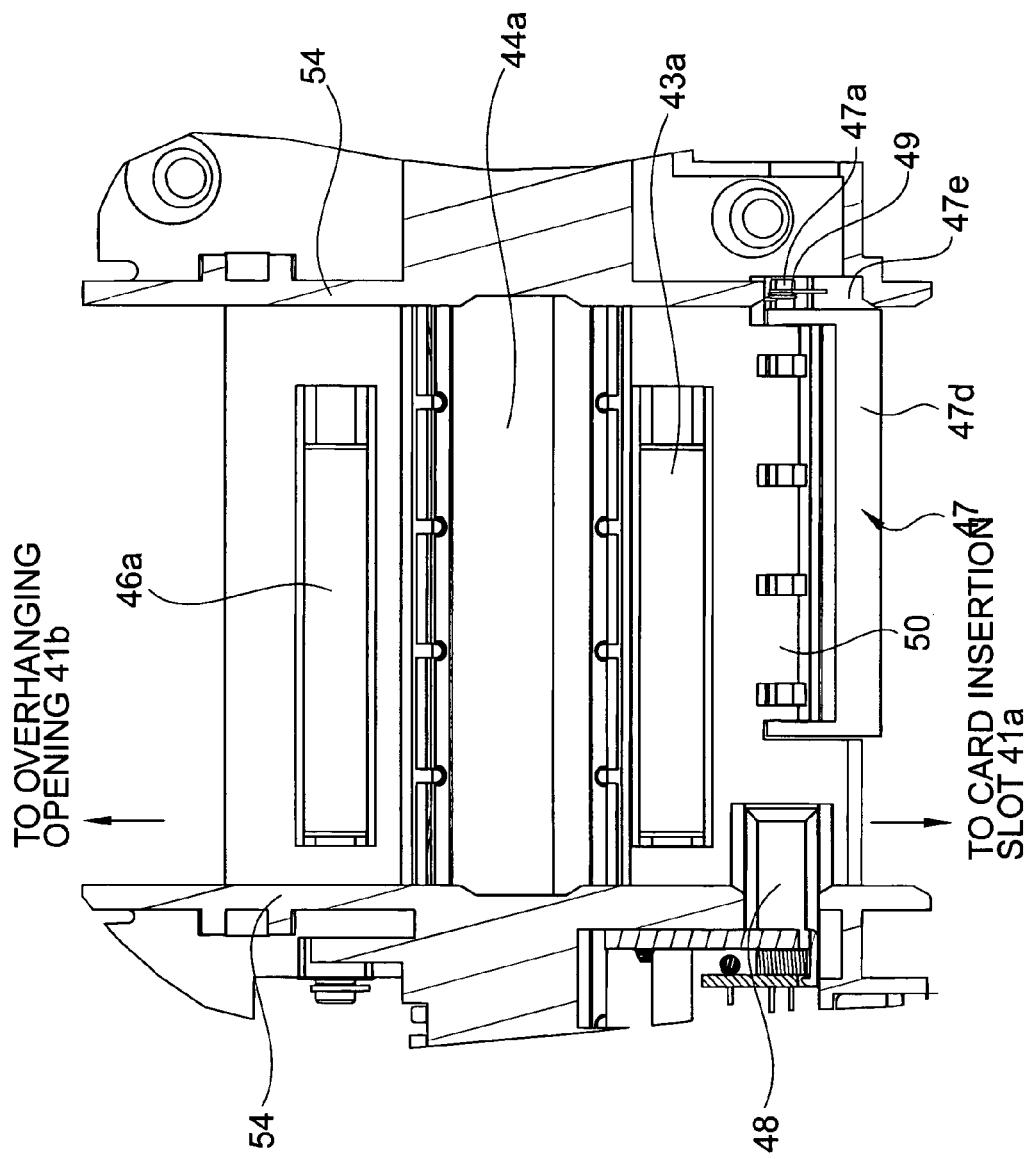
FIG. 9 is a section view showing the top of the card transportation path when the internal cover is open.

As shown in FIG. 9, the guide walls 54 assembled to the internal cover 42 are configured as guides correcting the insertion direction of the card C inserted to the card transportation path 41. For example, if the card C is inserted at a slight angle to the card transportation direction (which is perpendicular to the card insertion slot 41a and parallel to the card transportation surface 42a), the direction of card C travel will turn when the card C contacts one of the guide walls 54 as it is conveyed by the first transportation roller 43a and second transportation roller 46a. As a result, the guide walls 54 correct the direction of card transportation when the card C is inserted at a slight angle to the card transportation direction.

This correction of the card transportation direction by the first transportation roller 43a and first pressure roller 43b, and the second transportation roller 46a and second pressure roller 46b, occurs while the card C is carried from the card insertion slot 41a to the overhang opening 41b, and is completed by the time the card C has passed completely by the card image scanning sensor 44. Therefore, after the card C has passed completely beyond the card image scanning sensor 44, the card C is conveyed in the card transportation direction over the scanning surface 44a of the card image scanning sensor 44. As a result, the card image scanning sensor 44 is assured of always capturing card C images at the same angle.

Furthermore, as shown in FIG. 9, a card insertion detection sensor 48 is rendered near the card insertion slot 41a to the card transportation path 41. This card insertion detection sensor 48 is for detecting a card or other medium inserted from the card insertion slot 41a. The first transportation roller 43a and second transportation roller 46a are configured to start driving after this card insertion detection sensor 48 detects that a card was inserted. As a result, the start of card transportation through the card transportation path 41 is triggered by inserting a card.

This card insertion detection sensor 48 can also be configured to detect the card length at card insertion and the card length when the card is discharged. The card length at insertion is relative to the time from when the card C is detected by the card insertion detection sensor 48 and fed into the card transportation path 41 until the card C is no longer detected by the sensor 48. The card length when the card C is discharged is relative to the time from when the card C is detected after information is captured from the card C by the card image scanning sensor 44 until the card C is discharged from the card insertion slot 41a and the card C is no longer detected by the sensor 48.

If the two detected card lengths are not the same, the printer 10 can thus determine that the card C was not conveyed at a constant speed due to some unknown external factor, for example, when the card was inserted or when the card was discharged after scanning, and to thus determine that capturing image data from the card C failed.

The card C length could be detected using the card image scanning sensor 44 instead of using the card insertion detection sensor 48. The card image scanning sensor 44 detects the card length at insertion based on the time from when the card C is detected to the time when the card C is conveyed completely downstream from the card image scanning sensor 44 and is no longer detected, and detects the card length at discharge based on the time from when the card image scanning sensor 44 starts reading information from the card C until the time the card C is conveyed toward the card insertion slot 41a and is discharged therefrom. The card image scanning sensor 44 thus performs the same detection as the card insertion detection sensor 48.

A shutter 47 and lever 61 are also provided as a medium insertion prevention mechanism to prevent inserting a card C from the card insertion slot 41a when the internal cover 42 is open.

Figure 10:
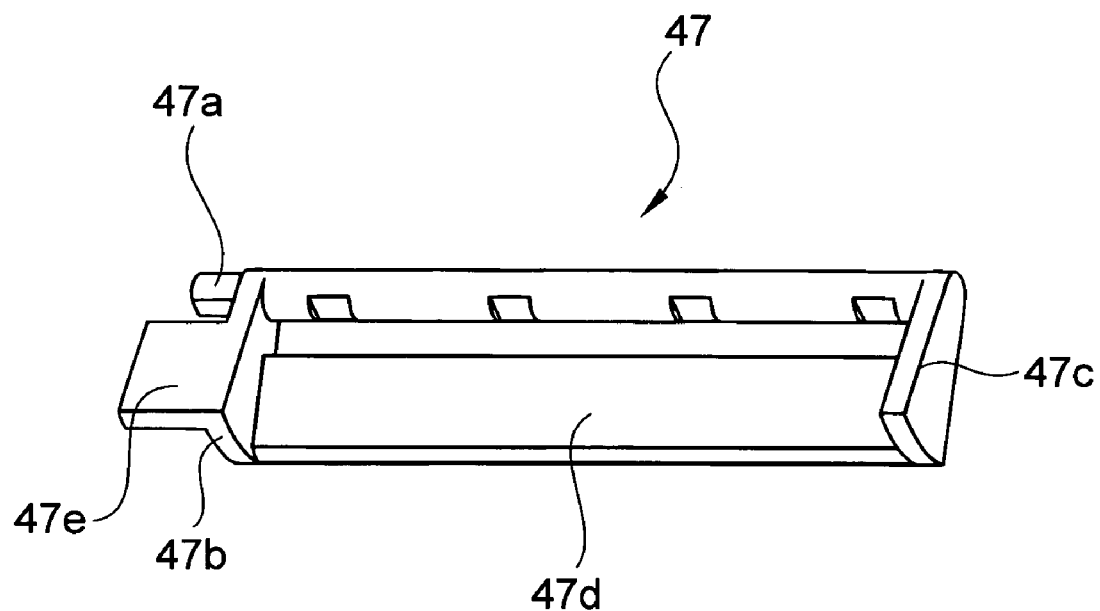
FIG. 10 is an oblique view showing the shutter.

As shown in FIG. 10, the shutter 47 is an integral molding having a rotary shaft 47a, an arc-shaped base 47b fixed near the center of the arc near one end of the rotary shaft 47a, an arc-shaped insertion prevention part 47c fixed near the center of the arc near the other end of the rotary shaft 47a, a reinforcing member 47d disposed between the base 47b and insertion prevention part 47c, and a operating lever 47e rendered integrally to the base 47b.

As shown in FIG. 4, FIG. 6, FIG. 8, and FIG. 9, the shutter 47 is assembled between the card insertion slot 41a and first transportation roller 43a with the rotary shaft 47a axially supported freely rotatably to a fixed part 50 rendered on the top cover 13a side of the card transportation path 41.

Figure 11:
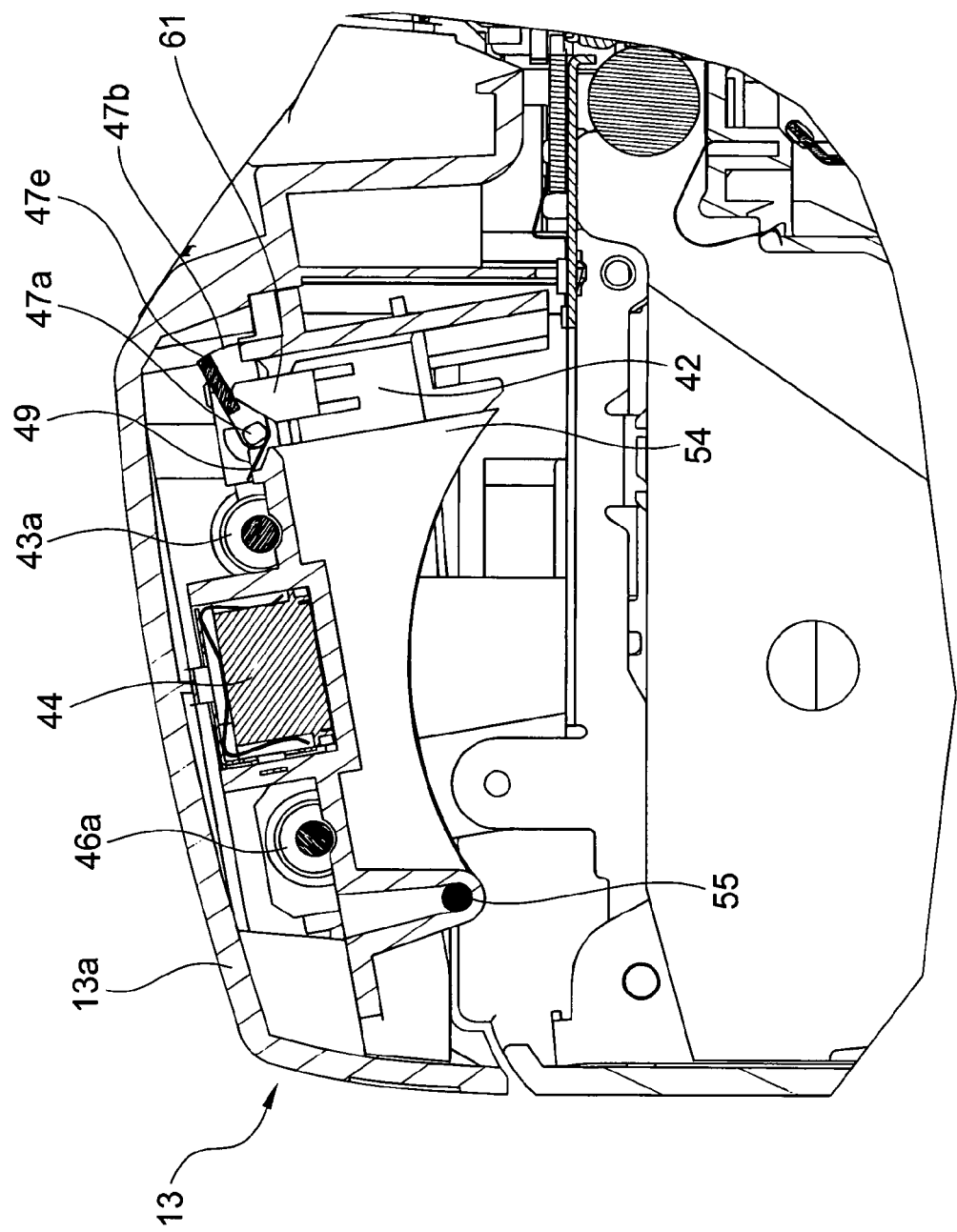
FIG. 11 is a section view showing the top cover unit in order to describe the opening/closing operation of the shutter.

As shown in FIG. 11, the lever 61 is disposed on the side of the internal cover 42 at a position where the lever 61 contacts the operating lever 47e when the internal cover 42 is closed. When this internal cover 42 is closed, the lever 61 thus contacts the operating lever 47e of the shutter 47, thereby pushing the shutter 47 away from the card transportation path 41. The shutter 47 is urged from this position in the direction rotating towards the card transportation path 41 by a spring member 49.

Figure 12:
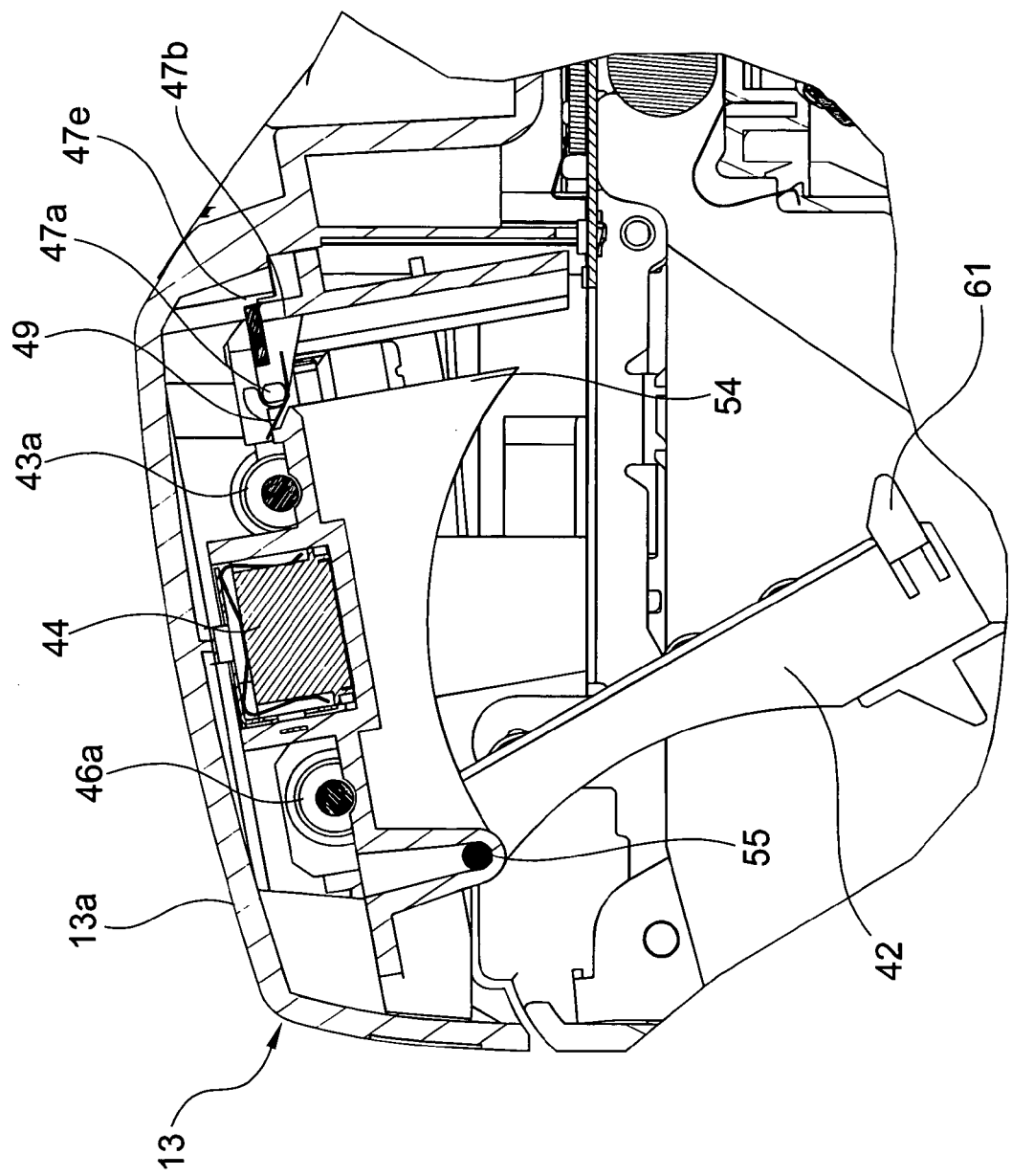
FIG. 12 is a section view showing the top cover unit in order to describe the opening/closing operation of the shutter.
Figure 13:
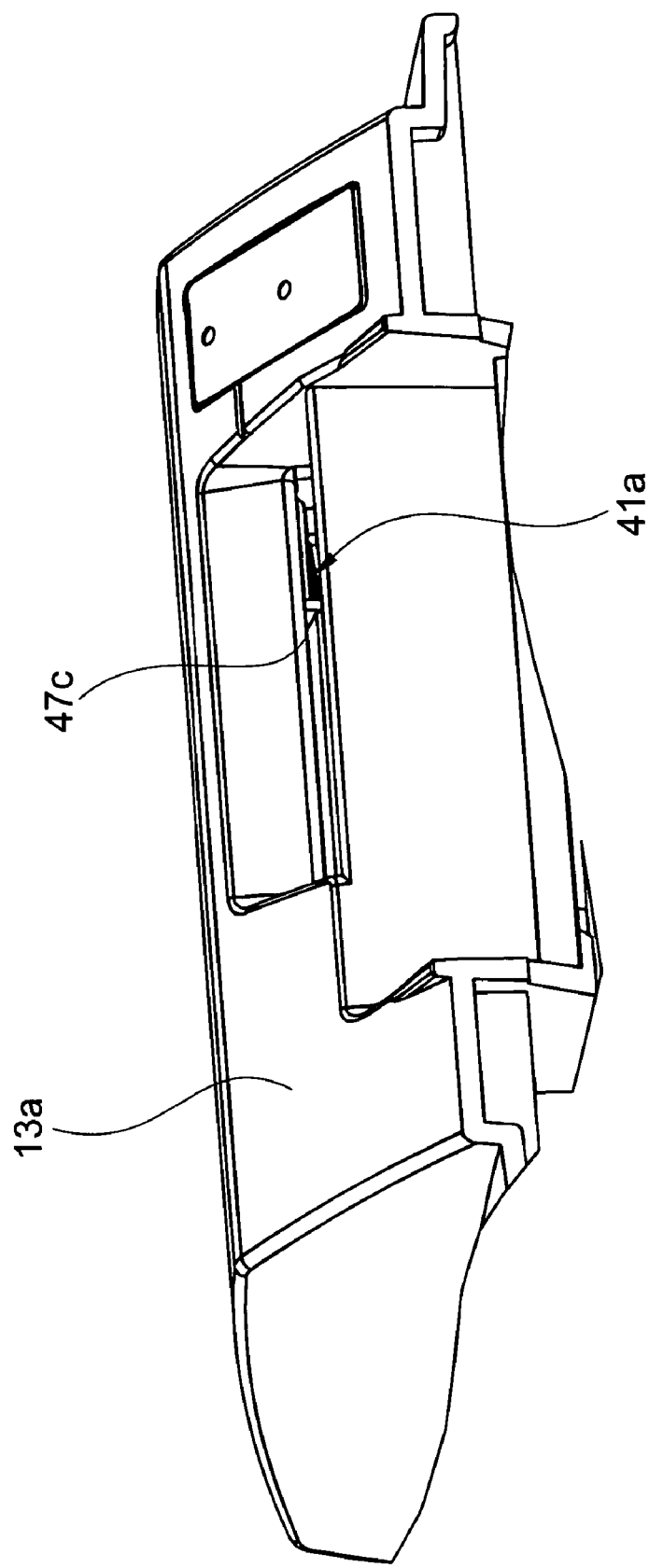
FIG. 13 is an oblique view showing the card insertion opening when the shutter is closed.

When the internal cover 42 is opened as shown in FIG. 12, however, the lever 61 separates from the operating lever 47e of the shutter 47, and the force of the spring member 49 causes the shutter 47 to rotate into the card transportation path 41. The insertion prevention part 47c of the shutter 47 is thus positioned so that it closes the card transportation path 41, thereby preventing inserting a card C from the card insertion slot 41a (see FIG. 13).

As a result, when the top cover unit 13 is open and the internal cover 42 is open, or when the top cover unit 13 is closed with the internal cover 42 still open, a card C cannot be inserted from the card insertion slot 41a.

It will thus be apparent that a printer 10 with an image scanning sensor according to this embodiment of the invention has a back case unit 11 including a roll paper compartment 30 for holding roll paper P; a front cover unit 12 forming a slip transportation path 21 for conveying a slip S between the back case unit 11 and front cover unit 12; a top cover unit 13 assembled to open and close so that the roll paper compartment 30 of the back case unit 11 is covered when the top cover unit 13 is closed, and forming a roll paper transportation path 35 for conveying the roll paper P between the back case unit 11 and top cover unit 13; a front printing unit 25 and back printing unit 23 disposed along the slip transportation path 21 as a slip printing unit for printing to slips S; a thermal print head 33 disposed along the roll paper transportation path 35 for printing to roll paper P; and a card image scanning sensor 44 disposed to the top cover unit 13 as an image scanner for capturing image data recorded to a card C.

As described above the single printer 10 will print to slips S, print to roll paper P, and capture image data from cards C and can be placed in the confined space of a sales counter, for example to enable printing to slips S, printing to roll paper P, and capturing image data from cards C using only the space needed to install a single device.

Furthermore, since the printer 10 has an internal cover 42 located between the top cover unit 13 and back case unit 11 which is assembled to open and close to the top cover unit 13 when this internal cover 42 is closed, the card transportation path 41 is formed between the internal cover 42 and top cover unit 13 for conveying a card C with the card image scanning sensor 44 being disposed along this card transportation path 41.

The internal cover 42 between the top cover unit 13 and back case unit 11 of the a printer 10 affords easily cleaning components, parts replacement, and maintenance of parts on and around the card transportation path 41 by opening the top cover unit 13 and then opening the internal cover 42.

Furthermore, according to this embodiment of the invention a card insertion slot 41a rendered to the top cover unit 13 for inserting a card C to the card transportation path 41, and a medium insertion prevention mechanism will prohibit inserting a card C from the card insertion slot 41a when the internal cover 42 is open.

Moreover, inserting a card when the card transportation path 41 is not formed, that is, when scanning is not possible, prevents accidental damage to the printer resulting from forcibly inserting a card.

Furthermore, the medium insertion prevention mechanism of a printer 10 with an image scanning sensor according to this embodiment of the invention has a shutter 47 rotatably disposed to the top cover unit 13 for blocking the card transportation path 41 when the internal cover 42 is open, and a lever 61 disposed to the internal cover 42 for holding the shutter 47 in a specific retracted position allowing inserting a card C from the card insertion slot 41a when the internal cover 42 is closed.

A medium insertion prevention mechanism can thus be easily rendered in a printer 10 with an image scanning sensor according to this embodiment of the invention by adding the simple configuration of a shutter 47, and a lever 61 for holding the shutter 47 in a particular position according to the open or closed position of the internal cover 42.

The top cover unit 13 of a printer 10 with an image scanning sensor according to this embodiment of the invention also has guide walls 54 for guiding a card C in the card transportation path 41.

When a card C is inserted at an angle to the card transportation path 41, the guide walls 54 in this printer 10 with an image scanning sensor according to this embodiment of the invention correct the insertion direction of the card C to align with the card transportation direction, thereby ensuring that the card image scanning sensor 44 always reads image data from the card C at the same angle.

A printer 10 with an image scanning sensor according to this embodiment of the invention can also be configured to measure card length using a card insertion detection sensor 48 rather than using a card image scanning sensor 44.

A printer 10 with an image scanning sensor according to this embodiment of the invention also has an overhang opening 41b disposed to the top cover unit 13 so that a card C inserted to the card transportation path 41 can temporarily overhang outside of the top cover unit 13.

When the card transportation path 41 can be configured with sufficient actual physical length, this configuration of the invention can increase the effective length of the card transportation path 41 by letting the card C overhang to the outside. A compact card image scanning unit 40 can therefore be achieved.

Furthermore, the overhang of the card C from the overhang opening 41b in a printer 10 with an image scanning sensor according to this embodiment of the invention is less than the distance L between the position P where the top cover unit 13 is farthest from the back side of the printer 10 and the back side of the case 11 when the top cover unit 13 is fully open.

Therefore, if the printer 10 with an image scanning sensor is installed with the back of the printer 10 to a wall and is located to assure this distance L between the case and the wall when the top cover unit 13 is open, the card C will not hit the wall at the back of the printer when the card C overhangs from the overhang opening 41b if the overhang of the card C is less than this distance L. This enables the printer 10 with an image scanning sensor to be used without being concerned about the card C hitting the wall when the card C overhangs from the overhang opening 41b.

This embodiment of the invention provides both a front printing unit 25 and back printing unit 23 for printing to slips S so that both the front and back sides can be printed with the slip S passing through the slip transportation path 21 only once.

This embodiment of the invention is also configured with a scanner for capturing image data from the slip S disposed to the slip transportation path 21. If the inserted slip S is a check, for example, this configuration enables the slip image scanning sensor 26 disposed to the slip transportation path 21 to capture an image of the check, and the card image scanning unit 40 to capture an image of the driver license or other identification presented by the person writing the check. By thus reading the check and reading a driver license or other identification containing information useful for verifying the person presenting the check using a printer 10 with an image scanning sensor according to this embodiment of the invention, it is easy to later verify who presented the check. The captured image data could also be sent to an external authentication server, for example, to verify the person using the check.

It should be noted that while a front printing unit 25 and back printing unit 23 are both provided as the slip S printing unit in this embodiment of the invention, the invention shall not be so limited and only the front printing unit 25 or the back printing unit 23 could be provided.

Furthermore, this embodiment of the invention is configured to read image data from slips S, but the invention shall not be so limited and image data could be selectively captured from the slips S as needed.

Furthermore, a driver license or other card C is described as the card type data recording medium, and a card image scanning sensor 44, which is an image scanner, is used as the data reader in this embodiment of the invention, but the invention shall not be so limited. For example, the data recording medium read by the image scanner could be a business card, check, or magnetic stripe card, the data reader could be an MICR reader for processing checks or a magnetic card reader for reading magnetic stripe cards.

Embodiment 2

A second embodiment of a printer with an image scanning sensor according to the present invention is described next. Further description of like parts in this embodiment and a printer 10 with an image scanning sensor according to the first embodiment described above is omitted below to avoid duplication.

Figure 14:
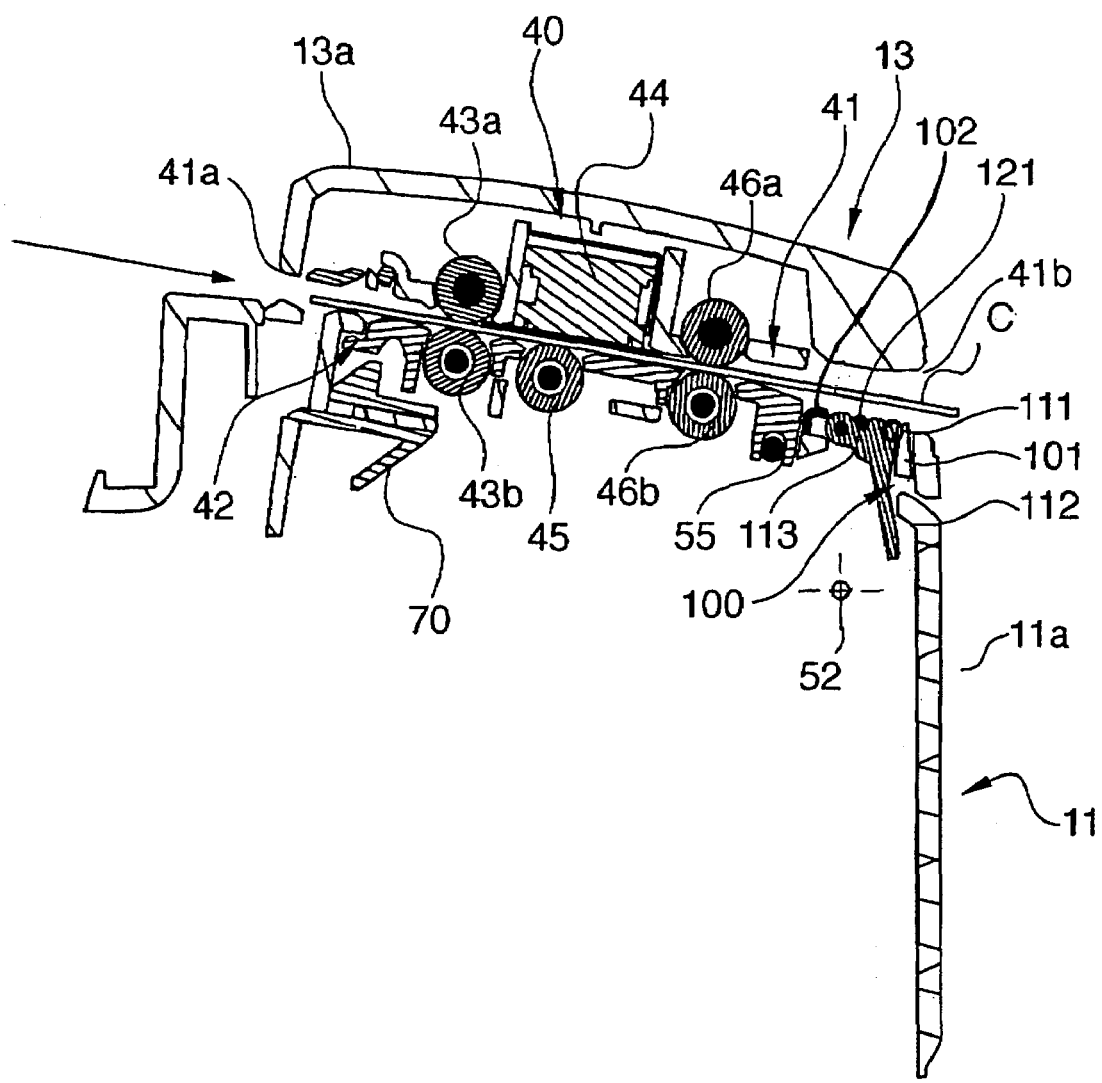
FIG. 14 is a section view showing major parts of a printer with an image scanning sensor according to a second embodiment of the invention.

As shown in FIG. 14, a stopper mechanism 100 is provided between the second pressure roller 46b and overhang opening 41b disposed at the back of the back case unit 11 as a medium movement prevention mechanism for preventing movement of the card C when the top cover unit 13 is open.

Figure 18:
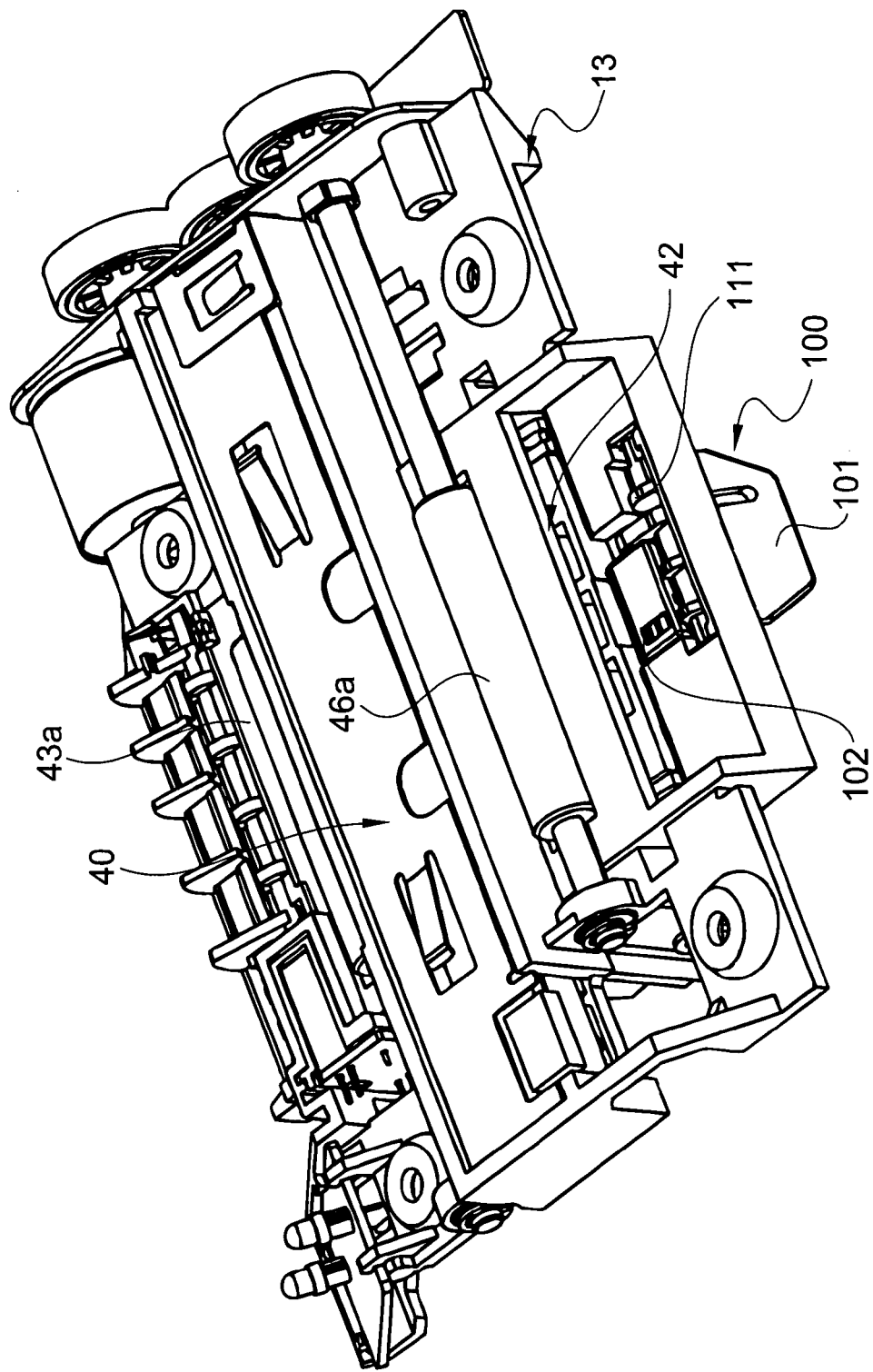
FIG. 18 is an oblique view of the top cover unit shown in FIG. 14 as seen with the top cover removed.
Figure 19:
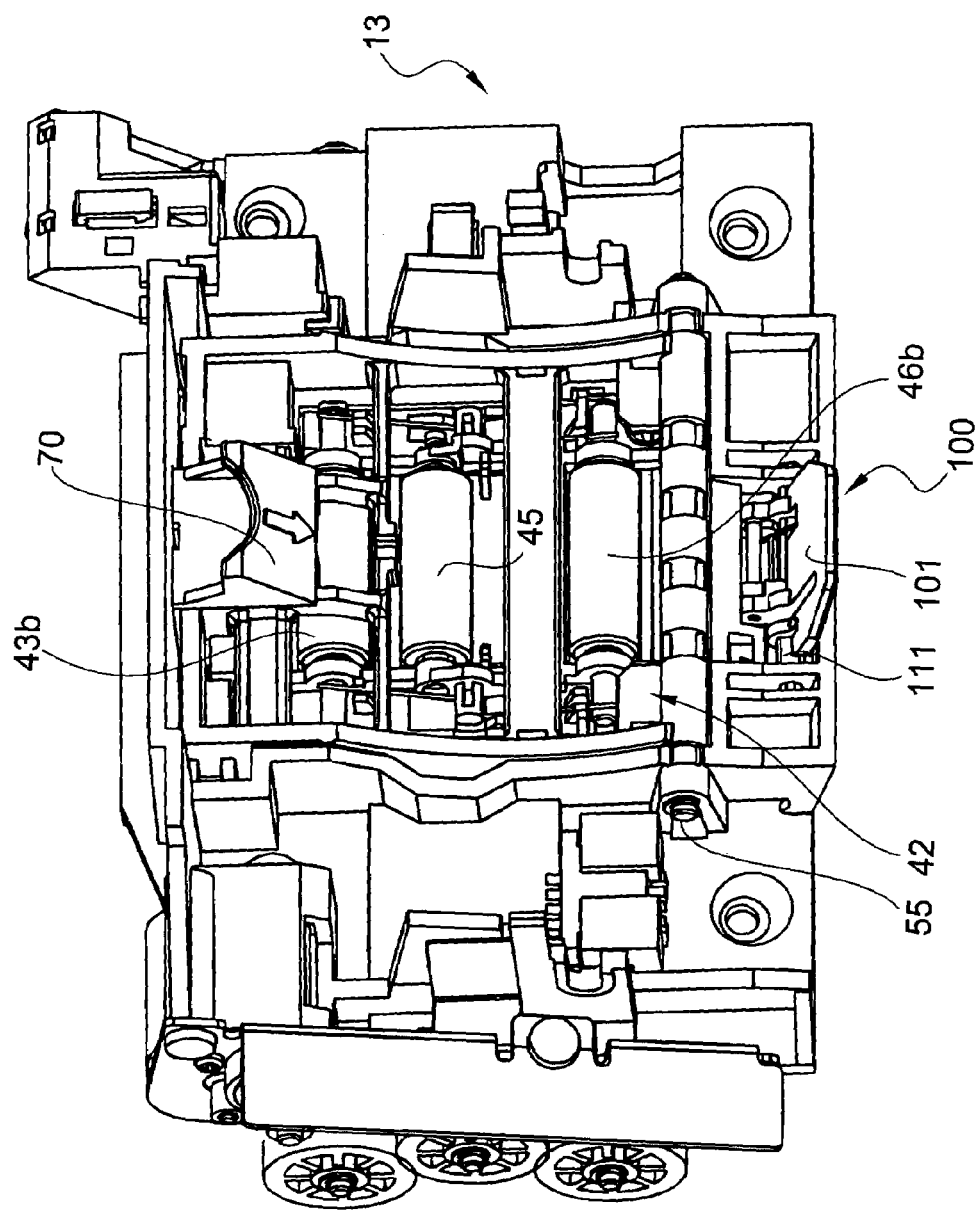
FIG. 19 is an oblique view of the top cover unit shown in FIG. 18 as seen from below.

The stopper mechanism 100 prevents the card C from falling out from the overhang opening 41b when the top cover unit 13 is open and opening lever 70 is operated to open the internal cover 42, and is disposed towards the back from the hinge 55 supporting the internal cover 42 freely rotatably. It should be noted that the stopper mechanism 100 is disposed on the top cover unit 13 side in this embodiment as shown in FIG. 18 and FIG. 19, but could be assembled to the internal cover 42.

The stopper mechanism 100 of this embodiment obstructs movement of the card C (particularly falling out from the overhang opening 41b) in conjunction with opening and closing the top cover unit 13 as shown in FIG. 15 to FIG. 19. The main components of this stopper mechanism 100 are a rotating lever (rotating member) 101, clamping member 102 and torsion spring 104 (see FIG. 21), and torsion spring 103. The rotating lever 101 is rotatably supported on the top cover unit 13 by way of a support stud 111. The clamping member 102 and torsion spring 104 are disposed to the rotating lever 101 for swinging relative thereto via a support shaft 121, and form a stopper having a flexible contact part for clamping the card C. The torsion spring 103 acts as a holding member for holding the clamping member 102 in a retracted position to allow movement of the card C when the top cover unit 13 is open.

Figure 20:
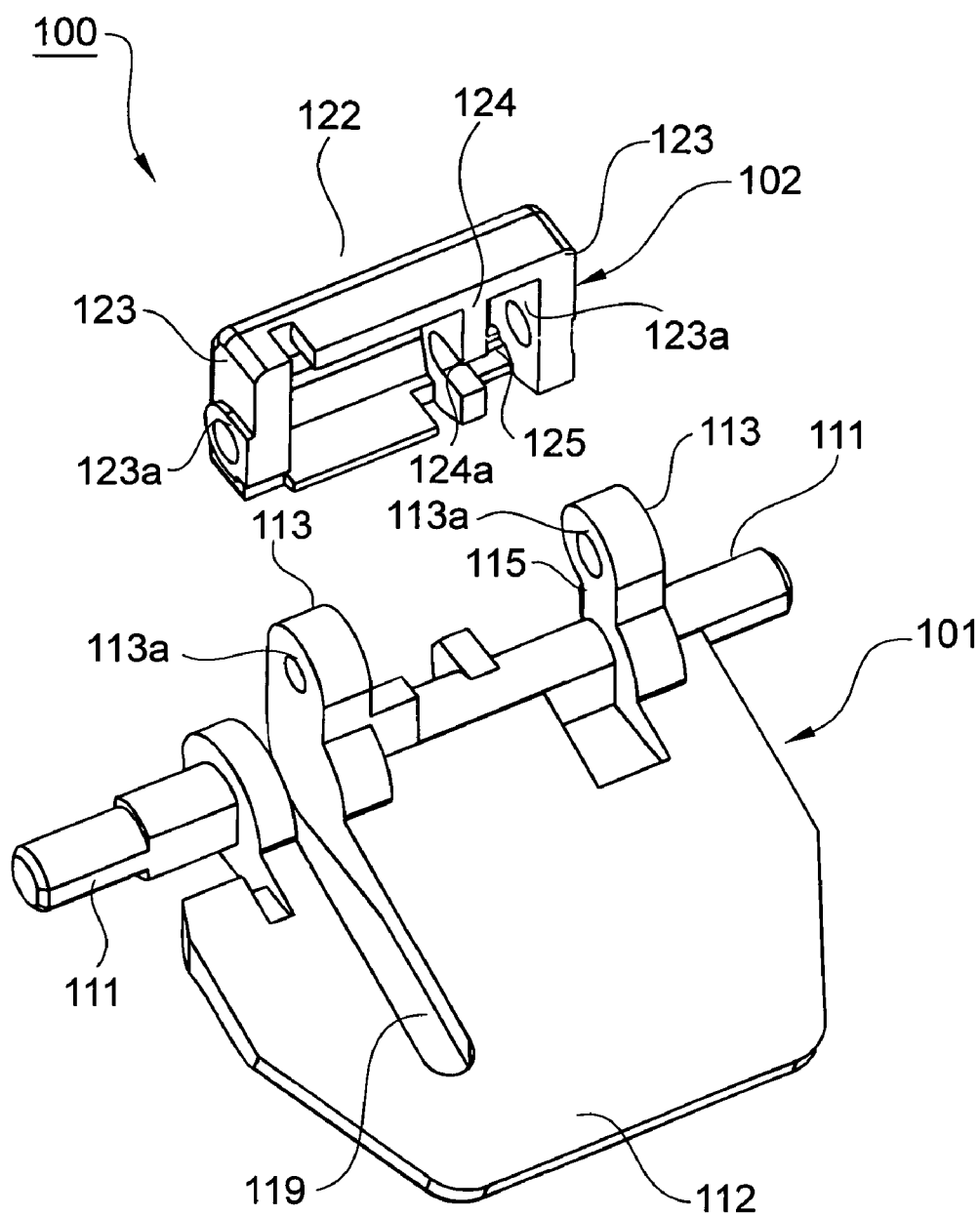
FIG. 20 is a partially exploded oblique view showing the configuration of the stopper mechanism shown in FIG. 14.
Figure 21:
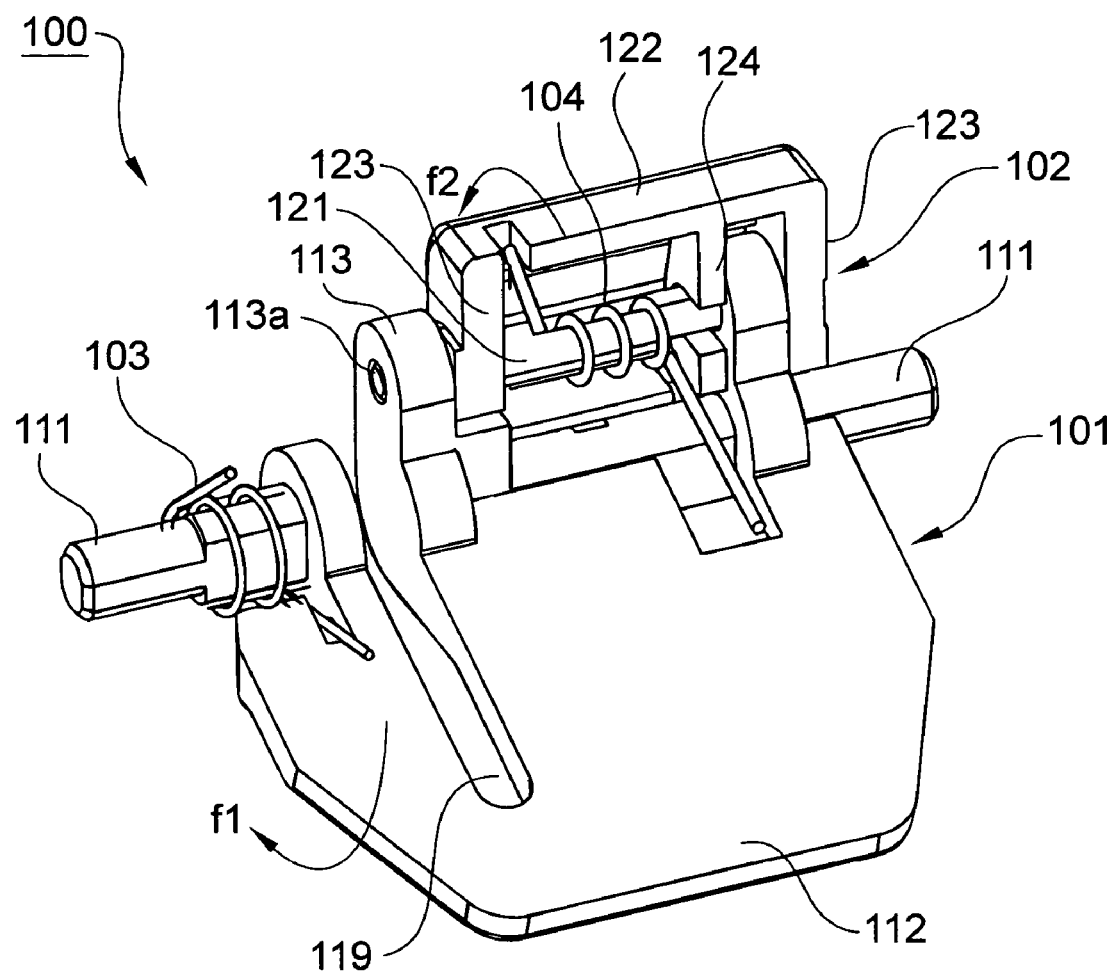
FIG. 21 is an oblique view of the stopper mechanism shown in FIG. 20 when assembled.
Figure 22:
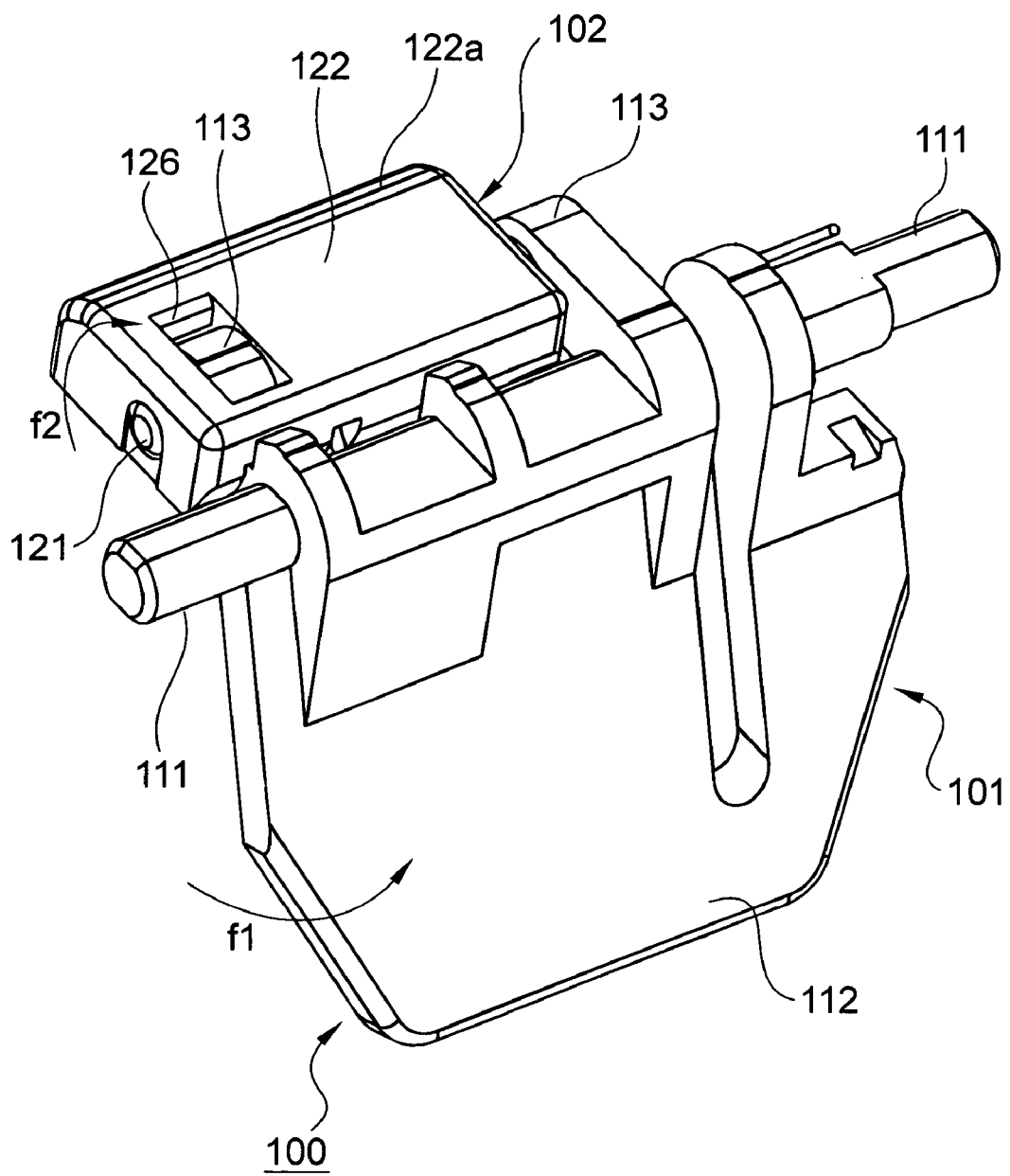
FIG. 22 is an oblique view showing the stopper mechanism shown in FIG. 21 from a different angle.
Figure 23:
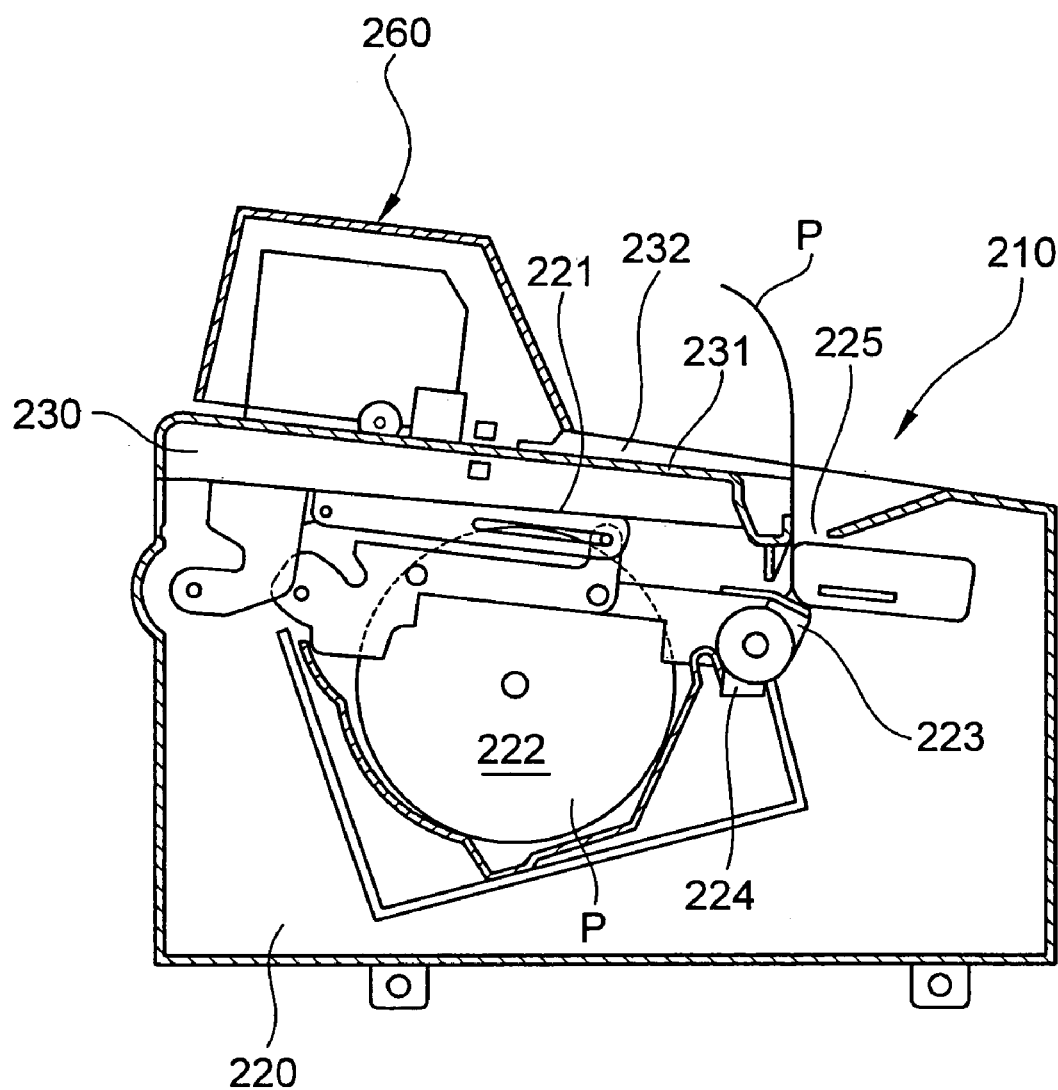
FIG. 23 is a section view showing a conventional hybrid printer.

As shown in FIG. 20 to FIG. 22, the rotating lever 101 of stopper mechanism 100 is a single plastic molding substantially L-shaped when seen from the side with a pair of support studs 111 protruding from both sides at the crook of the L. These support studs 111 fit into support holes (not shown) in the top cover unit 13, and thereby enable the rotating lever 101 to turn freely relative to the top cover unit 13.

As shown in FIG. 20, the rotating lever 101 has a plate-like engaging part 112 corresponding to one leg of the L, and a pair of brackets 113 corresponding to the other leg of the L. The brackets 113 are separated along the axis of the support studs 111 with a gap therebetween.

A slit 119 facilitating fitting the support studs 111 into the mating holes of the top cover unit 13 is rendered in the engaging part 112. The brackets 113 are positioned so that this slit 119 is not between the brackets 113, that is, so that the brackets 113 do not interfere with using the flexibility afforded by the slit 119 to fit the support studs 111 in the matching holes. A support hole 113a is formed in each bracket 113 for assembly to clamping member 102.

The clamping member 102 assembled to the rotating lever 101 has a rectangular plate part 122 of which the surface faces the card transportation path 41 when the stopper mechanism 100 is finally assembled to the top cover unit 13 as shown in FIG. 14; a pair of side walls 123 formed to the back side on opposite ends of the plate part 122; and a middle wall 124 rendered between the pair of side walls 123 so as to assure sufficient space to house one of the brackets 113 between the middle wall 124 and one side wall 123.

The ends of a single support shaft 121 fit through the support hole 123a rendered in each of the side walls 123, and this support shaft 121 is fit into the support holes 113a in the brackets 113, thereby assembling the clamping member 102 to the brackets 113 of the back case unit 11 so that the clamping member 102 can pivot freely on the support shaft 121. Note that a notch 124a is also rendered in the middle wall 124, and the support shaft 121 fits in this notch 124a.

When assembling the clamping member 102 to the rotating lever 101, one of the brackets 113 is located to the outside of one side wall 123, and the other bracket 113 is between the other side wall 123 and the middle wall 124 as shown in FIG. 21. As shown in FIG. 22, a hole 126 is opened in the plate part 122 to avoid interference with the other bracket 113.

The support shaft 121 rotatably supporting the clamping member 102 is disposed to one side of the plate part 122. The clamping member 102 is therefore supported in a cantilevered manner by the support shaft 121, and the edge member 122a at the rotating distal end of the plate part 122 can swing at a position projecting from the edge of the bracket 113.

As shown in FIG. 21, a torsion spring 103 is wound to the outside of one support stud 111 between the rotating lever 101 and top cover unit 13 so as to rotationally urge the rotating lever 101 in one direction to the top cover unit 13 (the retraction direction allowing the card C to move; in the direction of arrow f1). Another torsion spring 104 is wound to the outside of the support shaft 121 between the clamping member 102 and rotating lever 101 so as to elastically rotationally urge the clamping member 102 in one direction to the rotating lever 101 (the clamping direction holding the card C; in the direction of arrow f2).

The clamping member 102 is assembled to the rotating lever 101 so that it is normally substantially parallel to the brackets 113 (see FIG. 21, FIG. 22) but can rock from this position towards the engaging part 112. Stops 115 and 125 are also provided between the rotating lever 101 and clamping member 102 to prevent the clamping member 102 from rotating passed the position substantially parallel to the brackets 113 (see FIG. 20).

The torsion spring 103 flexibly rotationally urges the clamping member 102 in the direction causing the stops 115, 125 to touch. When the stops 115, 125 do not touch, the clamping member 102 can flexibly apply pressure to the member (card C in this embodiment) touching the surface side of the plate part 122.

The operation of the stopper mechanism 100 thus comprised is described below.

First, as shown in FIG. 14, this stopper mechanism 100 is assembled to a specific position to the top cover unit 13 where the rotating lever 101 is positioned to the overhang opening 41b side (the back of the printer), the clamping member 102 is positioned on the second pressure roller 46b side (the front of the printer), and the engaging part 112 of the rotating lever 101 points downward from the support stud 111.

When thus assembled, the top edge of the case 11a of the back case unit 11 is adjacent to the outside (the back side of the printer) of the engaging part 112, and the rotating lever 101 is urged in the counterclockwise direction as seen in the figure by the force of torsion spring 103 when the top cover unit 13 is closed. As a result, the clamping member 102 assembled to the rotating lever 101 is held at the position retracted from the card transportation path 41, and the card C can move freely.

Further rotation of the rotating lever 101 or clamping member 102 urged by the force of torsion spring 103 is limited by contact with the top cover unit 13 or other case part. Furthermore, the clamping member 102 is rotationally urged toward the card transportation path 41 when thus assembled, but the action of the stops 115, 125 holds the clamping member 102 in the retracted position substantially parallel to the bracket 113.

Figure 15:
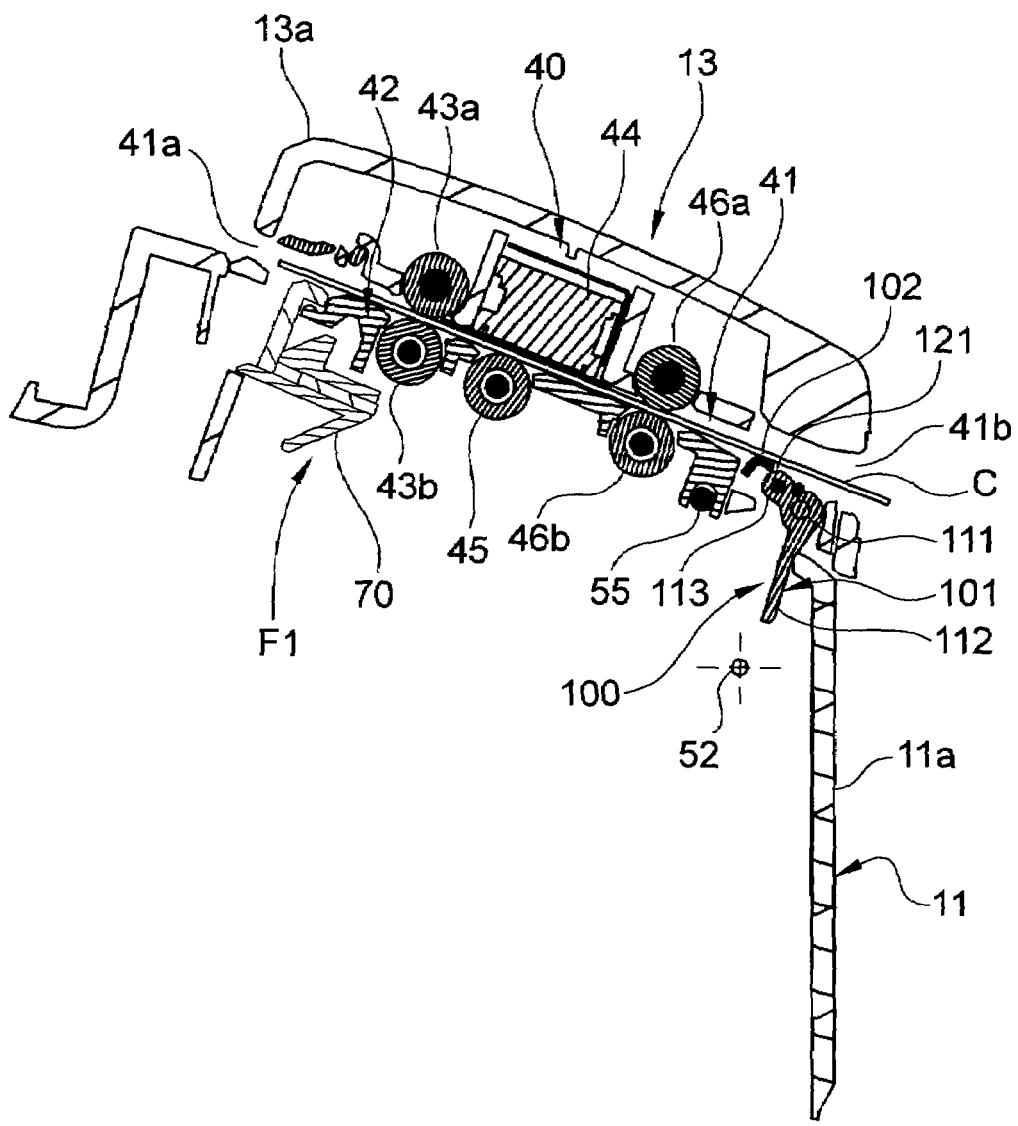
FIG. 15 is a section view of major components when the top cover unit in FIG. 14 is opening.
Figure 16:
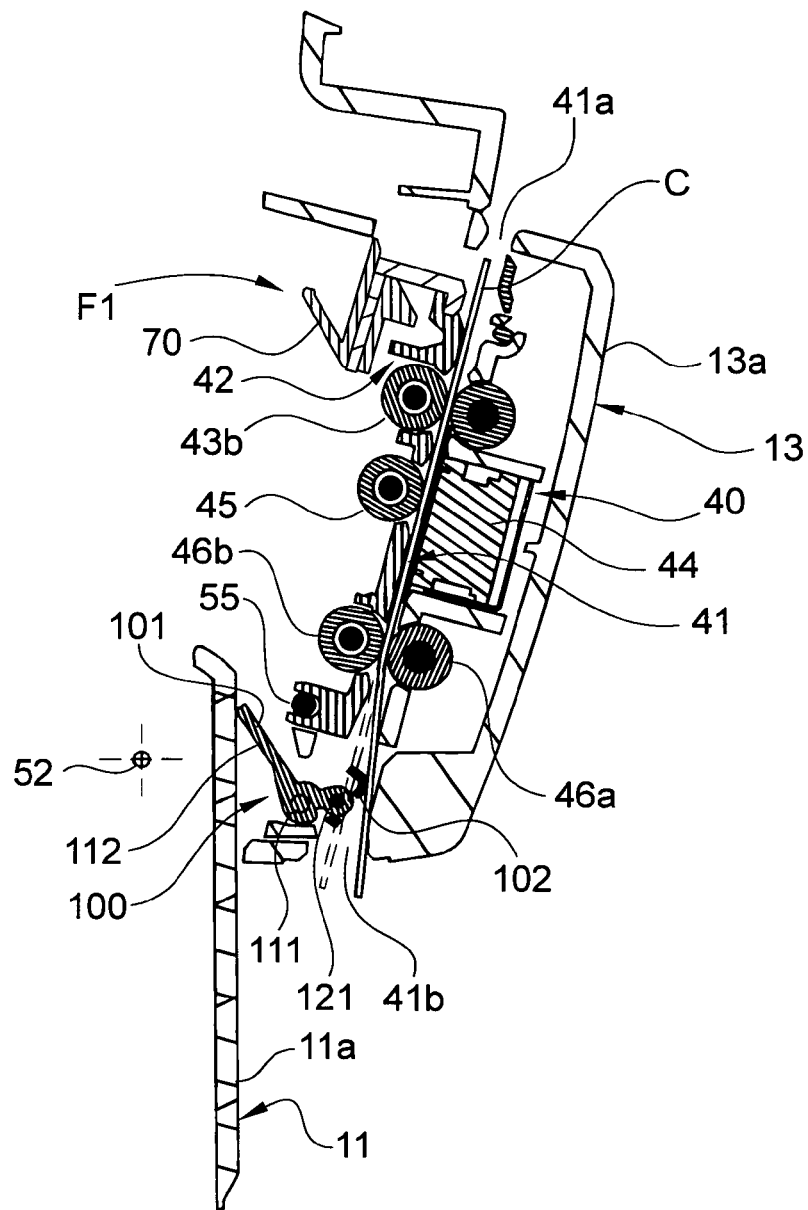
FIG. 16 is a section view of major components when the top cover unit in FIG. 15 is completely open.

As shown in FIG. 15 and FIG. 16, the engaging part 112 of the rotating lever 101 moves in contact with the top edge of the case 11a in conjunction with the upward opening of the top cover unit 13 in the direction of arrow F1. As a result, the rotating lever 101 rotates clockwise as seen in the figure in resistance to the force of torsion spring 103, and the clamping member 102 assembled to the distal end of the rotating lever 101 therefore protrudes into the card transportation path 41.

That is, the rotating lever 101 rotates in conjunction with opening and closing the top cover unit 13 because the top edge part of the case 11a is positioned appropriately to the path of engaging part 112 rotation in conjunction with opening and closing the top cover unit 13.

If a card C is stuck in the card transportation path 41 near the overhang opening 41b, the card C is clamped against the top cover 13a by the force of the torsion spring 104 as a result of the edge member 122a of the clamping member 102 applying pressure to the surface of the card C.

Figure 17:
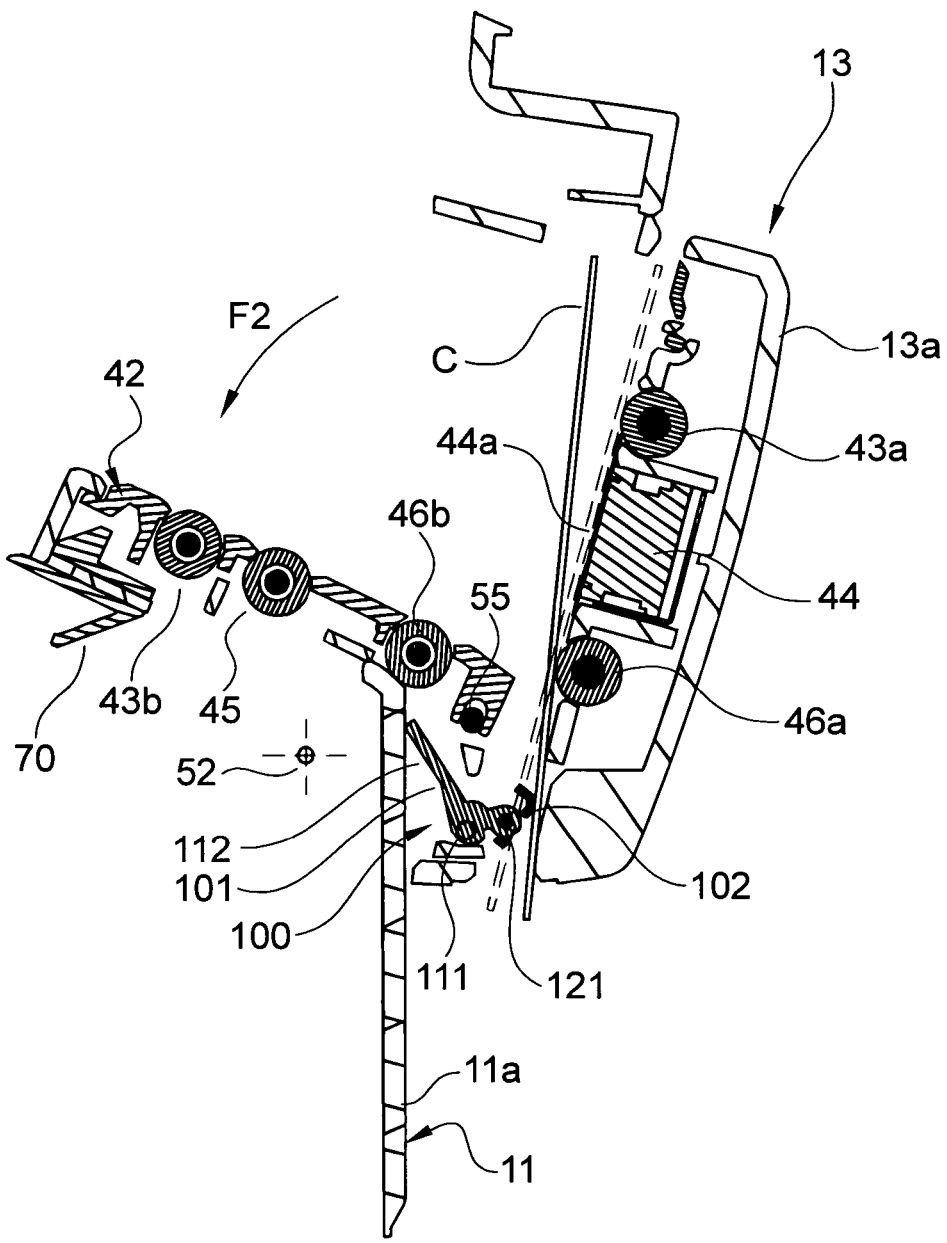
FIG. 17 is a section view of major components when the top cover unit in FIG. 16 is open and the internal cover is also open.

If the internal cover 42 is then pulled open from the top cover unit 13 in the direction of arrow F2 as shown in FIG. 17, the card transportation path 41 is immediately opened, and the card C is released by the rollers 43a, 43b, 46a, 46b. However, because the edge member 122a of clamping member 102 in this stopper mechanism 100 still flexibly presses the card C to the top cover 13a at this time, the card C is held reliably between the top cover 13a and clamping member 102.

As a result, the card C will not fall out from the overhang opening 41b at the back of the printer 10 even when the top cover unit 13 is opened to the substantially vertical open position, the internal cover 42 is then opened, and the rollers conveying the card C through the card transportation path 41 release the card C. It should be noted that the card C thus prevented from falling out by the stopper mechanism 100 can be easily removed by pushing it upstream or downstream along the card transportation path 41, or by grabbing it from the open part of the internal cover 42.

As described above, when the top cover unit 13 of a printer 10 with an image scanning sensor and medium transportation mechanism according to this embodiment of the invention is open, the clamping member 102 of a rotating lever 101 in the stopper mechanism 100 protrudes into the card transportation path 41, thereby clamping the card C and prevent the card C from moving. As a result, the card C is prevented from falling out from the overhang opening 41b when the top cover unit 13 is opened and the internal cover 42 is then opened.

Furthermore, if a card C is stuck in the card transportation path 41, the internal cover 42 of the top cover unit 13 can be opened without worrying that the card C will drop behind the back of the printer, and a jammed card C can therefore be easily removed.

Furthermore, the rotating lever 101 of the stopper mechanism 100 is normally urged to the retracted position by the force of torsion spring 103, and rotates to the card clamping side as a result of the engaging part 112 engaging the top edge of the case 11a when the top cover unit 13 is opened, thus affording a compact means preventing the card C from falling out.

Furthermore, because the clamping member 102 for holding the card C against the top cover 13a is flexibly urged in the clamping direction by torsion spring 104, the card C can be reliably held regardless of variations in card C thickness. Furthermore, this configuration absorbs assembly error between the various components, and can therefore be used without increasing the parts precision or assembly precision.

It will be obvious that the configuration of the top cover unit in the medium transportation mechanism, data reader, internal cover, medium transportation path, and medium movement prevention mechanism of the present invention shall not be limited to the configurations described above, and can be varied in many ways without departing from the scope of the present invention.

This embodiment has been described as using a torsion spring 103 as the holding member for holding the clamping member 102 in the retracted position, the force of this torsion spring 103 urging the rotating lever 101 to the retracted position, and rotation of the rotating lever 101 in the card clamping direction against the force of the torsion spring 103 linked to the engagement of the engaging part 112 with the top edge of the case 11a when the top cover unit 13 is opened. However, the rotating lever 101 could be flexibly urged in the card clamping direction by the torsion spring, and a lever could be rendered on the case 11a side as the holding member for holding the rotating lever 101 in the retracted position in resistance to the force of the torsion spring so that it engages the clamping member 102 when the top cover unit 13 is closed and disengages when the top cover unit 13 is open.

This embodiment has also been described using a stopper having a flexible contact part for holding a card C with a clamping member 102 and torsion spring 104 disposed to a rotating lever 101 to cause a swinging motion, but it could be configured without using the clamping member 102 and torsion spring 104, that is, so that it holds the card C directly by means of an elastic contact member made from an elastic material such as rubber on the distal end of a stopper rendered integrally to a rotating lever. With this configuration the rubber on the end of the stopper absorbs variations card C thickness.

In this embodiment of the invention, the medium movement prevention mechanism, which prevents movement of card C by protruding into the card transportation path 41 when the top cover unit 13 is open, is configured to press the card C to the top cover 13a using the clamping member 102 of a rotating lever 101. The medium movement prevention mechanism shall not, however, be limited to mechanisms that apply pressure to the card C in order to prevent movement of the card C.

When the total length of the card transportation path formed between the internal cover and top cover unit is longer than the card C, and the card C could become jammed inside the card transportation path at a position upstream of where the stopper on the rotating lever intervenes in the card transportation path, the card C can be prevented from moving and falling out by configuring the stopper to intervene at a position where it can receive the card C that is free to fall.

As also noted above, the stopper mechanism 100 could be disposed to the internal cover 42 instead of to top cover unit 13.

This embodiment of the invention is also described using a driver license or similar card C as the card-type data recording medium, and using a card image scanning sensor 44 as the data reader. The invention shall not be so limited, however, and can be applied to medium conveyance mechanisms for transporting information storage media such as business cards, checks, or magnetic stripe cards as the data recording medium, or use a magnetic card reader or other data reader.

A printer according to the present invention thus affords printing to slips, printing to continuous form paper, and reading image data from a medium using a single printer with an image scanning sensor. It is therefore possible to print to slips, print to continuous paper, and read image data from cards when, for example, there is limited installation space available at a checkout counter in a store and it is only possible to assure installation space sufficient for one device. It is therefore not necessary to consider how to install two devices such as a printer and a scanner.

Furthermore, because a medium movement prevention mechanism intervenes in the medium transportation path and prevents movement of a data recording medium when the top cover unit is open with a printer according to the present invention, the medium is prevented from falling out from the printer when the top cover unit is open and the internal cover is also open.

The internal cover assembled to the top cover unit can therefore also be opened for easier servicing and repair without worrying about the medium falling behind the printer case. The medium that is prevented from falling out by the medium movement prevention mechanism can also be easily removed by pushing it upstream or downstream in the medium transportation path, or by grabbing it from the open part of the internal cover.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer comprising:
   a back case unit having a continuous paper compartment for holding continuous paper;
   a top cover unit assembled to open and close the back case unit so as to cover the continuous paper compartment when closed, and for forming a continuous paper transportation path for conveying the continuous paper between the top cover unit and the back case unit;
   a first print unit disposed to the continuous paper transportation path for printing to the continuous paper;
   a data reading device incorporated in the top cover unit so as to move with the top cover unit relative to the continuous paper compartment for reading information recorded or printed on an external medium when the medium is inserted into the printer; and
   an internal cover located between the top cover unit and the back case unit with the internal cover being assembled to the printer to open and close relative to the top cover unit and with the internal cover having one side forming a medium transportation path for the medium when the internal cover is closed and for providing easy access to the medium transportation path for maintenance when the internal cover is opened.

2. A printer as described in claim 1, wherein the data reading device is an image scanning sensor for reading image data recorded or printed on the medium.

3. A printer as described in claim 1, further comprising:
   a front case unit having a slip transportation path for conveying a slip between the front case unit and the back case unit; and
   a second print unit disposed to the slip transportation path for printing to slips.

4. A printer as described in claim 1 further comprising:
   an insertion opening through which the medium can be inserted into the printer;
   wherein the medium transportation path having one end adjacent the insertion opening for conveying the medium between the internal cover and the top cover unit; and
   with the data reading device disposed adjacent the medium transportation path.

5. A printer as described in claim 1, wherein the top cover unit has guide walls for guiding media in the medium transportation.

6. A printer as described in claim 1, wherein an opening is formed to the top cover unit to enable the medium to overhang a predetermined distance defining an overhang length from one end of the medium transportation path.

7. A printer as described in claim 1,
   wherein the insertion opening is a slot disposed to the top cover unit for inserting the medium to the medium transportation path; and
   further comprising a medium insertion prevention mechanism for preventing the insertion of the medium into the slot when the internal cover is open.

8. A printer as described in claim 1, further comprising a medium movement prevention mechanism for preventing movement of the medium when the top cover unit is open.

9. A printer comprising:
   a back case unit having a continuous paper compartment for holding continuous paper;
   a top cover unit assembled to open and close the back case unit so as to cover the continuous paper compartment when closed, and for forming a continuous paper transportation path for conveying the continuous paper between the top cover unit and the back case unit;
   a first print unit disposed to the continuous paper transportation path for printing to the continuous paper;
   a data reading device incorporated in the top cover unit so as to move with the top cover unit relative to the continuous paper compartment for reading information recorded or printed on an external medium when the medium is inserted into the printer;
   an internal cover located between the top cover unit and the back case unit and assembled to open and close relative to the top cover unit; and
   an insertion opening through which the medium can be inserted into the printer;
   wherein when the internal cover is closed, a medium transportation path is formed with the medium transportation path having one end adjacent the insertion opening for conveying the medium between the internal cover and the top cover unit; and with the data reading device disposed adjacent the medium transportation path.

10. A printer as described in claim 9,
    wherein the insertion opening is a slot disposed to the top cover unit for inserting the medium to the medium transportation path; and further comprising a medium insertion prevention mechanism for preventing the insertion of the medium into the slot when the internal cover is open.

11. A printer as described in claim 10, further comprising:
a shutter rotatably disposed to the top cover unit for blocking the medium transportation path when the internal cover is open; and
a lever disposed to the internal cover for holding the shutter in a predetermined position permitting the insertion of the medium into the slot when the internal cover is closed.

12. A printer as described in claim 9, wherein the top cover unit has guide walls for guiding media in the medium transportation path.

13. A printer as described in claim 9 wherein an opening is formed to the top cover unit to enable the medium to overhang a predetermined distance defining an overhang length from one end of the medium transportation path.

14. A printer as described in claim 13, wherein the overhand length is less than the distance between the position at which the top cover unit is farthest removed from the back side of the back case unit when the top cover unit is open, and the back side of the back case unit.

15. A printer as described in claim 9, further comprising a medium movement prevention mechanism for preventing movement of the medium when the top cover unit is open.

16. A printer described in claim 15, wherein the medium movement prevention mechanism comprises:
a rotating member rotatably assembly to the internal cover or the top cover unit for intervening in the medium transportation path when the top cover unit is open, and
a holding member for inhibiting the rotating member for intervening in the medium transportation path when the top cover unit is closed.

17. A printer as described in claim 16, wherein the rotating member comprises:
an engaging part rotatably assembled to the internal cover or the top cover unit, and engaging the back case unit when the top cover unit opens; and
a stopper protruding into the medium transportation path when the engaging part is engaged with the back case unit.

18. A printer as described in claim 17, wherein the holding member is a spring member urging the stopper to a retracted position to permit movement of the medium when the top cover unit is closed.

19. A printer as described in claim 17, wherein the stopper comprises an elastic contact part for clamping the medium.

20. A printer as described in claim 19, wherein the elastic contact part comprises a clamping lever assembled for swinging relative to the rotating member, and
a spring member for urging the clamping lever in the clamping direction.

21. A printer as described in claim 9, wherein the data reading device is an image scanning sensor for reading image data recorded or printed on the medium.

22. A printer as described in claim 9, further comprising:
a front case unit having a slip transportation path for conveying a slip between the front case unit and the back case unit; and
a second print unit disposed to the slip transportation path for printing to slips.

23. A medium transportation assembly for transporting an external medium which can be externally inserted therein to a data reading device for reading information recorded on the external medium comprising:
a housing having a top cover and a body to which the top cover is connected for opening and closing the top cover;
the data reading device being disposed to the top cover for reading information recorded on the external medium;
and internal cover located between the top cover and the body which can open and close when the top cover is open with the internal cover assembled relative to the top cover such that a medium transportation path is formed only when the internal cover is closed for conveying the external medium to the data reading device.

24. A medium transportation mechanism as described in claim 23, wherein the data reading device is an image scanning sensor for reading image data recorded on the external medium.

25. A medium transportation mechanism as described in claim 23, further comprising a medium movement prevention mechanism linked to the top cover unit opening/closing operation for preventing movement of the external medium by protruding into the medium transportation path when the top cover is open.

26. A medium transportation mechanism as described in claim 25, wherein the medium movement prevention mechanism comprises:
a rotating member rotatably assembled to the internal cover or the top cover and intervening in the medium transportation path when the top cover is open, and
a holding member for holding the rotating member in a retracted position permitting the external medium to move when the top cover is closed.

27. A medium transportation mechanism as described in claim 26, wherein the rotating member comprises:
an engaging part rotatably assembled to the internal cover or the top cover, and engaging body top when the top cover opens; and
a stopper protruding into the medium transportation path when the engaging part is engaged with the body top.

28. A medium transportation mechanism as described in claim 27, wherein the holding member is a spring member for holding the stopper in a retracted position to permit movement of the external medium when the top cover is closed.

29. A medium transportation mechanism as described in claim 27, wherein the stopper comprises an elastic contact part for clamping the external medium.

30. A medium transportation mechanism as described in claim 29, wherein the elastic contact part comprises:
a clamping lever assembled for swinging relative to the rotating member, and
a spring member for flexibly urging the clamping lever in the clamping direction.

* * * * *